(12) United States Patent
Kajita et al.

(10) Patent No.: US 6,275,280 B1
(45) Date of Patent: Aug. 14, 2001

(54) LCD WITH SPACERS HAVING PARTICULAR CHARACTERISTICS INCLUDING COMPRESSION STRESS

(75) Inventors: Junji Kajita; Keiji Tsuda, both of Shiga; Hideo Ido, Osaka; Hideshi Nomura, Tokyo; Shinichi Yamada; Tetsuya Goto, both of Shiga, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/051,153
(22) PCT Filed: Aug. 1, 1997
(86) PCT No.: PCT/JP97/02697
    § 371 Date: Apr. 2, 1998
    § 102(e) Date: Apr. 2, 1998
(87) PCT Pub. No.: WO98/05997
    PCT Pub. Date: Feb. 12, 1998

(30) Foreign Application Priority Data

Aug. 5, 1996 (JP) .................................... 8-221695
Aug. 5, 1996 (JP) .................................... 8-221804

(51) Int. Cl.$^7$ .................... G02F 1/1333; G02F 1/339; G02F 1/335
(52) U.S. Cl. .................... 349/155; 349/156; 349/110; 349/106
(58) Field of Search ................... 349/155, 156, 349/157, 110, 106

(56) References Cited

U.S. PATENT DOCUMENTS 4,678,284 * 7/1987 Tashiro .................................. 349/155
4,682,858 * 7/1987 Kanbe et al. .......................... 349/155
5,953,087 * 9/1999 Hoyt ...................................... 349/58

FOREIGN PATENT DOCUMENTS 0 113 064    7/1984 (EP).

OTHER PUBLICATIONS

H. Yamashita et al.: "P–48: Precise Cell–Thickness Control By Spacer–Ball–Free Structure and Its Application to Large–Size–TFT–LCDs", Sid International Symposium, Digest of Technical Papers, San Diego, May 12–17, 1996, vol. 27, May 12, 1996, pp: 600–2, XP000621060, Society for Information Display.

* cited by examiner

*Primary Examiner*—William L. Sikes
*Assistant Examiner*—Toan Ton
(74) *Attorney, Agent, or Firm*—Morrison & Foerster LLP

(57) ABSTRACT

The present invention provides a liquid crystal display element substrate having spacers fixed in non-display regions on the liquid crystal display element substrate, where the load compression displacement of these spacers in terms of a compression stress of 0.5 to 0.6 GPa is from 0.001 to 1 $\mu$m/mN. Further, it provides a liquid crystal display device which is characterized in that, in a liquid crystal display device where a liquid crystal layer is held between two liquid crystal display element substrates, at least one of these liquid crystal display element substrates is an aforesaid liquid crystal display element substrate. As well as realizing a sufficient cell gap the present invention has the effect that, by maintaining a uniform cell gap within the screen, the problems of a lowering in the display quality due to change in the cell gap and the generation of bubbles at the time of low temperature are resolved. The liquid crystal display element substrate of the present invention and the liquid crystal display device which employs it may be used as the display screens of personal computers, word processors, engineering work stations, navigation systems, liquid crystal televisions, videos and the like, and they are also suitable for use in liquid crystal projection, etc. Further, in the fields of optical communication and optical data processing, they are suitable for use as a spatial light modulator employing liquid crystals.

36 Claims, 6 Drawing Sheets

LCD WITH SPACERS HAVING PARTICULAR CHARACTERISTICS INCLUDING COMPRESSION STRESS

DESCRIPTION

1. Technical Field

The present invention relates to a liquid crystal display element substrate which has a spacer function, and to a liquid crystal display device in which this is included.

2. Background Art

In order to maintain the liquid crystal layer thickness (the cell gap), in conventionally-employed liquid crystal display devices plastic beads, glass beads or glass fibres are generally interposed between two liquid crystal display element substrates and used as spacers. Here, the plastic beads or other such spacers are positioned by spraying, so the positions between the two liquid crystal display element substrates (the positions within the screen) where they are arranged cannot be controlled accurately. In other words, spacers are also present in the display regions (the light transmitting regions within the screen, other than the light screening regions) on the liquid crystal display element substrate. Consequently, there is the problem of a lowering of the display quality of the liquid crystal display device due to light scattering and transmission by the spacers. Furthermore, the spacers tend to be maldistributed, and the display quality in those parts where spacers are bunched is impaired and there are also problems in terms of the precise maintenance of the cell gap. Consequently, not only is there a need to control with a high degree of accuracy the process of evenly spreading the spacers and the particle size distribution of the spacers, but also the difficulty of obtaining a liquid crystal display device of stable display quality by a simple method needs to be addressed. In addition, there is also the following problem. Since the spacers are spherical or have a rod-like shape, and effect point-like or line-like contact at the time of the cell press bonding, there is the disadvantage that the alignment layer or the transparent electrodes are easily damaged and display faults produced. Moreover, there is also the dis-advantage that the liquid crystal is contaminated by the damage to the alignment layer or transparent electrodes, and the effective voltage applied to the liquid crystal tends to be lowered.

In order to maintain the cell gap, in Japanese Unexamined Patent Publication Nos 56-140324, 63-824054, 4-93924, 5-196946 and 7-318950, liquid crystal display devices have been proposed which employ, as spacers, structures produced by the lamination of the coloured layers for forming a colour filter. However, there have been cases where cell gap unevenness is produced and a lowering of the display quality occurs in the liquid crystal display devices actually obtained by such techniques. With liquid crystal display devices, it is not easy to stick together the two liquid crystal display element substrates at a uniform force and, when the perimeter of the elements is sealed, strains remain where even just a slight unevenness in force occurs. The cell gap may be changed due to such slight strains and a lowering of the display quality readily tends to arise.

Again, there have been cases where display faults occur when the liquid crystal display device is subject to a force or impact from the outside. In particular, where a force has been locally applied, display unevenness is noted and there is a lowering of the display quality. Furthermore, problems are also produced when there is a variation in the height of the spacers formed. At the time of the cell (panel) assembly, the two liquid crystal display element substrates are stuck together by applying a certain degree of force, but when the force imposed on the substrates is removed problems can arise in that the spacer heights recover to form an uneven state. As a result, the number of effectively functioning spacers is reduced and there is an increased possibility of display unevenness. Moreover, if it not possible to maintain the cell gap accurately, bubbles may be generated in the cell when at low temperatures. Such bubbles lower the display quality.

The objective of the present invention is to offer a liquid crystal display element substrate where a uniform cell gap is maintained within the screen, and where the display quality is not reduced when subjected to a force or impact from outside, or when a change in cell temperature occurs; together with a liquid crystal display device in which this is included.

DISCLOSURE OF THE INVENTION

As a result of a painstaking investigation into means for resolving the aforesaid problems, the present inventors have discovered that by setting, in a specified range, the compression displacement of the spacers in response to a load lying within a specified compression stress range, the aforesaid objective can be attained, and the present invention has been perfected based thereon.

Specifically, the present invention provides a liquid crystal display element substrate which is characterized in that it has spacers fixed in non-display regions on the liquid crystal display element substrate, and the load compression displacement of these spacers for a compression stress of 0.5 to 0.6 GPa is from 0.001 to 1 $\mu$m/mN. Furthermore, the present invention provides a liquid crystal display device which is characterized in that, in a liquid crystal display device where a liquid crystal layer is held between two liquid crystal display element substrates, at least one of these liquid crystal display element substrates is an aforesaid liquid crystal display element substrate of the present invention.

EXPLANATION OF THE NUMERICAL CODES

Figure 1:
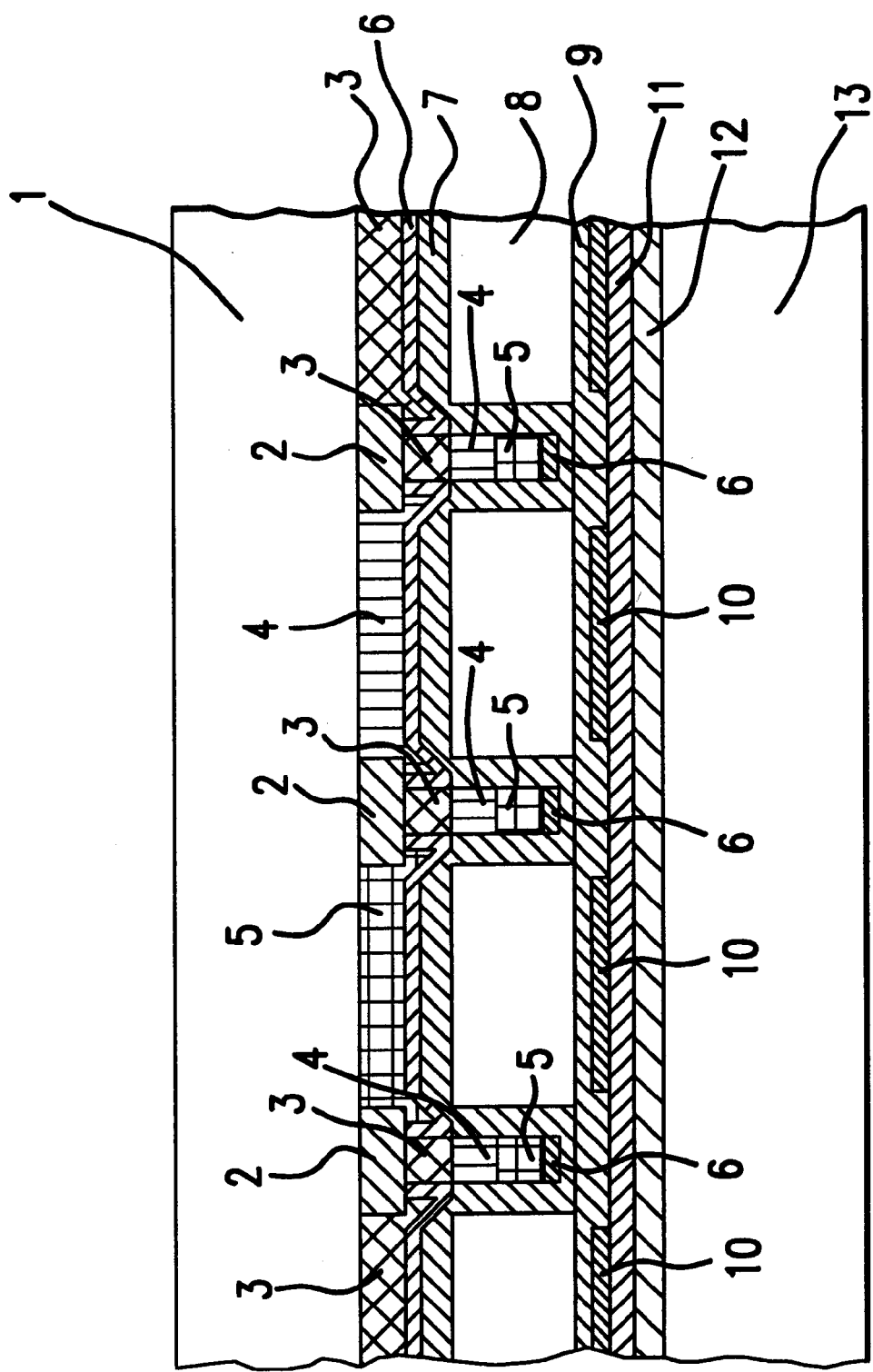
FIG. 1: is a schematic cross-section of a colour liquid crystal display device using the colour filter of the present invention.

| | | | |
|---|---|---|---|
| 1 | transparent substrate (glass substrate) | | |
| 2 | resin black matrix | 3 | coloured layer (B) |
| 4 | coloured layer (R) | 5 | coloured layer (G) |
| 6 | transparent electrode | 7 | alignment layer |
| 8 | liquid crystal | 9 | alignment layer |
| 10 | pixel electrode | 11 | insulating film |
| 12 | liquid crystal driving circuit ancillary electrode | | |
| 13 | transparent substrate (glass substrate) | | |
| 20 | black matrix | | |
| 21 | spacer first layer comprising coloured layer (B) | | |
| 22 | spacer second layer comprising coloured layer (R) | | |
| 23 | spacer first layer comprising coloured layer (G) | | |
| 24 | dot-shaped spacer | | |
| 25 | pixel stripe coloured layer (G) | | |
| 30 | transparent film | | |

BEST MODE FOR CARRYING OUT THE INVENTION

Normally, liquid crystal display devices have a structure in which a liquid crystal is held between two liquid crystal display element substrates which have been stuck together with spacers interposed. A liquid crystal display element substrate may possess electrodes, thin film transistors and colouring agents on the substrate as required according to the liquid crystal and the display mode, etc. Specifically, it may be a monochro-filter or colour filter with colouring agents, or it may be a substrate having a plurality of transistors such as a TFT substrate. Again, there may be spacers fixed to both liquid crystal display element substrates from which the liquid crystal display device is composed, or there may be spacers fixed to one or other of these liquid crystal display element substrates. However, from the point of view of the ease of liquid crystal display device assembly, it is preferred that the spacers be fixed onto one or other of the liquid crystal display element substrates.

In order to enhance the display quality, it is preferred that the liquid crystal display device has spacers fixed to non-display regions on the substrate. By non-display regions is meant the light screening area within the screen in the assembled state of the liquid crystal display device, and the regions corresponding to the screen exterior. On the other hand, the display regions are those regions other than the non-display regions.

Normally, the proportion of non-display regions within the screen of a liquid crystal display device is from 10 to 50%. However, on account of limitations due to spacer formation accuracy and the facing substrate, and since alignment faults arise in the vicinity of the spacers, there are restrictions on the places where the spacers can be arranged, and so it is not possible to form spacers to the maximum extent on non-display areas. Consequently, the proportion where spacer formation can be carried out is below 5% of the area within the screen, preferably less than 3% and more preferably less than 1%. The liquid crystal display device is produced by sticking together two liquid crystal display element substrates. At this time, a compression force of about 10,000 to 100,000 Pa is normally applied to the substrates. Thus, it is necessary that the spacers have the necessary mechanical characteristics to support this compression force in the restricted area.

According to the present invention, it has been discovered that this problem is resolved by offering a liquid crystal display element substrate having spacers fixed in non-display regions on the liquid crystal display element substrate, where the load compression displacement of said spacers for a compression stress of 0.5 to 0.6 GPa is from 0.001 to 1 $\mu$m/mN, together with a liquid crystal display device which is characterized in that, in a liquid crystal display device produced by holding a liquid crystal layer between two liquid crystal display element substrates, as least one of these liquid crystal display element substrates is an aforesaid liquid crystal display element of the present invention.

The aforementioned load compression displacement is preferably from 0.002 to 0.5 $\mu$m/mN and more preferably from 0.01 to 0.1 $\mu$m/mN. If the load compression displacement is less than 0.001 $\mu$m/mN, bubbles are generated within the cell when the liquid crystal display device constructed using this liquid crystal display element substrate is left at a low temperature of about −40° C., and the display quality is lowered. On the other hand, if the aforesaid load compression displacement exceeds 1 $\mu$m/mN, then stains remain in the liquid crystal display device due to the unevenness in the force applied when the two liquid crystal display element substrates are stuck together, and the cell gap is changed on account of such strains and the display quality is lowered. Further, stripy patches tend to be produced along the sealing region around the liquid crystal display device.

Here, the measurement of the load compression displacement can be carried out in the following manner. The compression load (F) and the compression displacement (L) are measured when a single spacer is subjected to compression testing, and the relation between them is plotted. The load compression displacement is determined as L/F. Furthermore, the area (S) of the uppermost flat region of the spacer is measured after testing. The compression stress is determined from F/S. Now, providing the aforesaid load compression displacement lies within the range 0.001 to 1 $\mu$m/mN at at least any one point within the range of compression stress 0.5 to 0.6 GPa, the spacer is included within the scope of the invention.

The spacers formed for maintaining the gap between the two substrates will, as an average, be subjected to a compression stress of value obtained by dividing the compression stress to which the substrate is subjected by the total area of the spacers. Consequently, the compression stress applied to a single spacer will differ according to the density of the spacers formed and the cross-sectional area per single spacer. Generally speaking, the compression stress applied to a single spacer is about 0.1 to 1 GPa, and so the load compression displacement is measured with consideration given to this range, in particular the range 0.5 to 0.6 GPa.

It is desirable that the elastic restitution factor of the spacers fixed in non-display regions on the liquid crystal display element substrate be 20 to 80% for a compression stress of 0.4 to 0.6 GPa, preferably 25 to 75% and still more preferably from 30 to 70%. If the elastic restitution factor is less than 20%, then when a liquid crystal display device is constructed using this liquid crystal display element substrate and a force or impact is applied to the display screen from outside, display unevenness is produced and the display quality is lowered. On the other hand, if the elastic restitution factor exceeds 80%, display unevenness tends to arise in the display screen when the liquid crystal display device is being assembled. Now, in the case where the spacers contain acrylic resin, the elastic restitution factor will be from 0.01 to 80%, preferably 0.01 to 70%, more preferably 0.1 to 60% and still more preferably 1 to 50%. In the case of an acrylic resin, if the elastic restitution factor is less than 0.01%, then when a liquid crystal display device is constructed using this liquid crystal display element substrate and a force or impact is applied to the display screen from outside, display unevenness is produced and the display quality is lowered. On the other hand, if the elastic restitution factor exceeds 80%, display unevenness tends to arise in the display screen at the time of the liquid crystal display device assembly.

Figure 2:
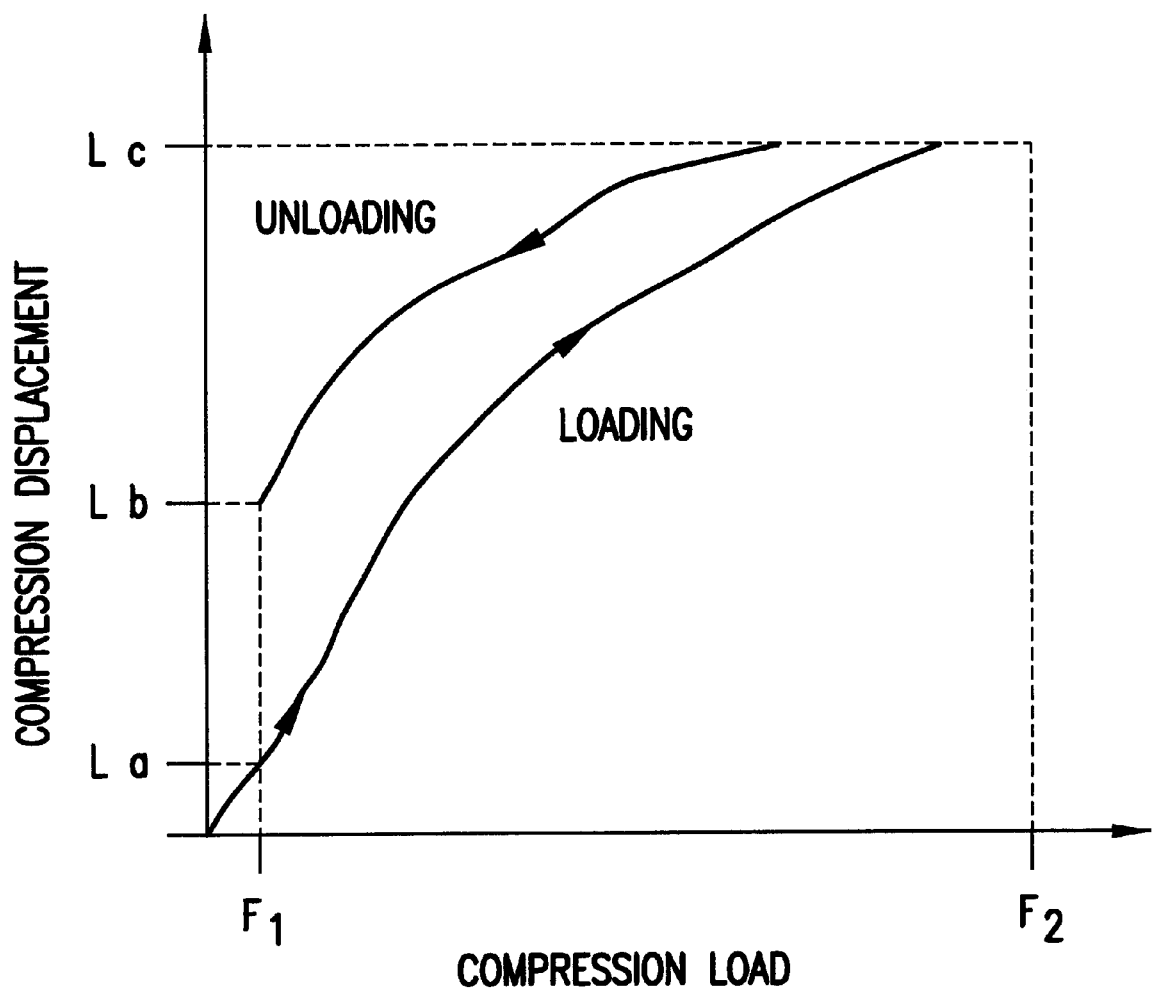
FIG. 2: is a graph showing an example of the relation between the compression load and compression displacement in the loading process and unloading process when measuring the elastic restitution of a spacer.

The elastic restitution factor of the spacers in the present invention for a compression stress can be measured in the following way. Using a micro-compression tester, or the like, a single spacer is subjected to loading, while increasing the compression load at a fixed rate. At the point when the compression load reaches $F_2$, unloading is then carried out with the compression load being decreased at a fixed rate until it reaches F1. The compression displacement is measured in this loading/unloading process. A graph plotted with the compression load on the horizontal axis and the compression displacement on the vertical axis is shown in FIG. 2. Now, the compression displacement does not need to be measured continuously and there may just be measured the displacement La at the time of final compression load F1 in the loading process, the compression displacement Lc at the time of application of compression load $F_2$ when there is a switchover from loading to unloading, and the displacement Lb at the final compression load F1 in the unloading process (see FIG. 2). The elastic restitution factor is obtained by the following numerical formula [I]

$$\text{elastic restitution factor} = (Lc-Lb)/(Lc-La) \times 100(\%) \quad [I]$$

The compression load $F_2$ is set such that the compression stress when $F_2$ is applied is 0.4 to 0.6 GPa. The compression stress is obtained by dividing $F_2$ by the area S of the flat region on the uppermost face of the spacer (area at the time when load $F_2$ applied). S can be measured using a microscope, etc. Further, the final compression load F1 is set so that the compression stress at the time of the load F1 is 0 to 0.06 GPa.

Additionally, the spacers fixed in non-display regions on the liquid crystal display element substrate will have a failure strength, in respect of a compression stress, of at least 0.1 GPa, preferably at least 0.3 GPa and more preferably at least 0.5 GPa. If the compression failure strength is less than 0.1 GPa, then the display quality will readily be lowered due to a force or impact from outside. Now, there is no upper limit to the compression failure strength and the greater it is the better but, normally, it is difficult to produce spacers having a compression failure strength exceeding 1 GPa.

When the load applied to a spacer is high, failure occurs in the spacer or in the spacer base (the black matrix, etc). Here failure means spacer fracture or cracking, cracking of the spacer base, or upheaval of the spacer base (that is to say the region of the base around the spacer protrudes). In other words, spacer failure includes not just the failure of the spacer itself but also failure of the base. However, collapse of fine protrusions around the top edge of the spacer which can be produced in the case where the spacers are formed by photo-lithography, etc, is not included. Thus, spacer failure means a physical change bringing about a chance in the spacer height such that the thickness of the liquid crystal layer (the cell gap) in the liquid crystal display device is altered.

Here, the measurement of the compression failure strength can be carried out as follows. The compression load ($F_h$) and the compression displacement ($L_h$) when a single spacer is subjected to compression testing are measured, and $L_h$ is plotted on the vertical axis against $F_h$ on the horizontal axis. If a commercial micro-compression tester is employed, then a $F_h$–$L_h$ curve can be traced continuously. When spacer failure occurs, a point of inflexion where the slope of the curve becomes smaller may sometimes be observed, and may be used as a measure to determine the compression load at the point when failure has occurred. Following testing, failure is confirmed by means of an optical microscope or electron microscope. After testing, by measuring the area of uppermost flat region of the spacer, and then dividing the compression load at the time of failure by this area, the failure strength can be obtained.

Furthermore, the spacers fixed in non-display regions on the liquid crystal display element substrate will have a thermal expansion coefficient at 25 to 50° C. of from 10 to 100 ppm/° C., preferably from 20 to 80 ppm/° C. and still more preferably from 30 to 60 ppm/° C. If the thermal expansion coefficient at 25 to 50° C. is less than 10 ppm/° C., bubbles will tend to be generated in the display region of a liquid crystal display device produced using this liquid crystal display element substrate. On the other hand, if the thermal expansion coefficient is greater than 100 ppm/° C., then display unevenness tends to be produced at high temperatures. Now, the spacer thermal expansion coefficient will lie within the range 10 to 100 ppm/° C. over the entire range 25 to 50° C.

The method of measuring the spacer thermal expansion coefficient is not particularly restricted, but the direct measurement of a formed spacer is preferred. For example, part of the liquid crystal display element substrate on which a spacer has been formed is cut away and an optical flat placed on the spacer, to produce a sample for thermal expansion coefficient measurement. Light is directed from the liquid crystal display element side (reverse face) and, with an interferometer, the change in the interference pattern is measured with the temperature varied from 25 to 50° C. The coefficient of thermal expansion can be determined by calculation from the spacer heights at 25° C. and at 50° C. Further, in the case where the spacer comprises a resin, a film of said resin may be separately prepared and the coefficient of thermal expansion measured by means of a thermomechanical analyser. For example, in the case of a spacer formed by lamination of blue, red and green coloured layers on the resin black matrix, a film may be formed by the lamination, in turn, of resin black matrix film, and blue, red and green coloured films, and the coefficient of thermal expansion of the laminate then measured by means of a thermomechanical analyser.

As the material from which the spacers with these characteristics are composed, there is selected for use a material with which the aforesaid load compression displacement specified in the present invention can be obtained. Photosensitive or non-photosensitive materials like polyimide resins, epoxy resins, acrylic resins, urethane resins, polyester resins and polyolefin resins are preferably used, but it goes without saying that, even from amongst such materials, there will be selected for use one which satisfies the aforesaid load compression displacement requirement. In particular, with polyimide resins and acrylic resins, the aforesaid load compression displacement is readily attained and, of these, polyimide resins are preferably employed in terms of achieving the load compression displacement. As stated, in the case where the spacers are formed with coloured layers, there are used for the spacers coloured materials produced by dispersing or dissolving colouring agent in these resins.

As photosensitive resins, there are the photo-degradable resin, photo-crosslinking resin and photo-polymerizing resin types, etc, and in particular, photosensitive compositions which contain monomer, oligomer or polymer with ethylenically unsaturated bonds and an initiator which generates radicals due to ultraviolet light, or photosensitive polyamic acid compositions, etc, are ideally employed.

As non-photosensitive resins, there are desirably used those aforesaid types of polymer which can undergo a development treatment. Resins which possess heat resistance such that they can withstand the heat applied in the transparent conductive electrode production process and the liquid crystal display device production process are preferred. Furthermore, resins with resistance to the organic solvents employed in the liquid crystal display device production process are preferred. Again, it goes without saying that readily-available resins having the aforesaid load compression displacement requirement are desirable. Hence, polyimide resins are particularly preferred.

The polyimide resins here are not especially restricted but, normally, a polyimide precursor in which structural units represented by the following general formula [1] (n=1–2) are the chief component and which undergo imidization by heating or with a suitable catalyst are ideally employed.

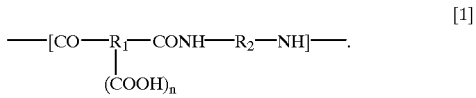

[1]

Furthermore, as well as imide bonding, the polyimide resin may include amide bonding, sulphone bonding, ether bonding, carbonyl bonding or other such bonding other than polyimide bonding.

In aforesaid general formula [1], $R_1$ is a trivalent or tetravalent organic group having at least two carbon atoms. From the point of view of heat resistance, $R_1$ is preferably a trivalent or tetravalent group containing a cyclic hydrocarbon, an aromatic ring or an aromatic heterocyclic ring, and having from 6 to 30 carbons. As examples of $R_1$, there are the phenyl group, biphenyl group, terphenyl group, naphthalene group, perylene group, diphenylether group, diphenylsulphone group, diphenylpropane group, benzophenone group, biphenyl-trifluoropropane group and cyclobutyl group, etc, but there is no restriction to these.

$R_2$ is a divalent organic group having at least two carbon atoms but, from the point of view of heat resistance, $R_2$ is preferably a divalent group containing a cyclic hydrocarbon, an aromatic ring or an aromatic heterocyclic ring, and having from 6 to 30 carbons. As examples of $R_2$, there are the phenyl group, biphenyl group, terphenyl group, naphthalene group, perylene group, diphenylether group, diphenylsulphone group, diphenylpropane group, benzophenone group, biphenyltrifluoropropane group, diphenylmethane group and the cyclohexylmethane group, etc, but there is no restriction to these. Polymer in which structural units [1] are the chief component may be composed of one each of such $R_1$ and $R_2$ groups, or it may be a copolymer composed of two or more types of either. Furthermore, in order to enhance the adhesion to the substrate, it is preferred that a bis(3-aminopropyl)-tetramethyldisiloxane or other such material with a siloxane structure be copolymerized, as a diamine component, within a range such that the heat resistance is not lowered.

As specific examples of polymers with structural units [1] as the chief component, there are the polyimide precursors synthesized from one or more carboxylic acid dianhydride selected from the group comprising pyromellitic acid dianhydride, 3,3',4,4-benzophenone-tetracarboxylic acid dianhydride, 3,3',4,4-biphenyltri-fluoro propanetetracarboxylic acid dianhydride, 3,3',4,4'-biphenylsulphonetetracarboxylic acid dianhydride and 2,3,5-tricarboxycyclopentylacetic acid dianhydride, and one or more diamine selected from the group comprising p-phenylenediamine, 3,3'-diaminodiphenylether, 4,4'-diaminodiphenylether, 3,4'-diaminodiphenylether, 3,3'-diaminodiphenylsulphone, 4,4'-diaminodiphenylsulphone, 4,4'-diaminodicyclohexylmethane and 4,4'-diaminodiphenyl-methane. However, there are no restrictions thereto. These polyimide precursors are synthesized by a known method, that is to say the tetracarboxylic acid di-anhydride and the diamine are selectively combined and reacted in a solvent.

Further, spacers containing acrylic resin are also preferred. The acrylic resin employed in such circumstances is a resin synthesized at a molecular weight of around 5,000 to 100,000 using about three to five types of monomer from amongst acrylic acid, methacrylic acid, alkyl acrylates and alkyl methacrylates like methyl acrylate and methyl methacrylate, cyclic acrylates and methacrylates, and hydroxyethyl acrylates and methacrylates, etc. Now, in the case where the spacer contains acrylic resin, the acrylic resin content of the resin component from which the spacer is composed is preferably at least 50 wt % and more preferably at least 60 wt %. Whether the material from which an acrylic resin spacer is composed is photosensitive or non-photosensitive is not restricted but, from the point of view of facilitating microfabrication of the spacer, a photosensitive material is preferably used. In the case of a photosensitive material, a composition in which photopolymerizable monomer and photoinitiator are blended with the acrylic resin is preferably used. As photo-polymerizable monomers, there are difunctional, tri-functional and polyfunctional monomers, examples of the difunctional monomers being 1,6-hexanediol diacrylate, ethyleneglycol diacrylate, neopentylglycol diacrylate and triethyleneglycol acrylate; examples of the trifunctional monomers being trimethylolpropane triacrylate, penta-erythritol triacrylate and tris(2-hydroxyethyl)-isocyanate; and examples of polyfunctional monomers being ditrimethylolpropane tetraacrylate, and dipentaerythritol penta- and hexa-acrylate, etc. Further, as the photo-initiator, there may be used a benzophenone, thioxanthone, imidazole or triazine type, or a mixture thereof.

In the resin from which the aforesaid spacers are composed, colouring agent may also be added where required. As colouring agents, there can be suitably employed organic pigments, inorganic pigments and dyes, etc, and various additives such as ultraviolet absorbers, dispersing agents and levelling agents may also be added. When the spacer is required to be light screening, as well as light screening agents like carbon black, metal oxide powders such as titanium oxide and iron tetraoxide metal sulphide powders and metal powders, there can also be used mixtures of red, blue and green pigments, etc. Of these, carbon black is outstanding in its light screening property and is especially preferred. When light screening and insulating properties are required of the spacer, there may be employed carbon black the surface of which has been coated with fine particles of an insulating inorganic compound such as aluminium oxide, titanium oxide or iron oxide, etc.

There are no particular restrictions on the amount of colouring agent or light screening agent added to the resin from which the spacers are composed, but it is preferred that the weight ratio of resin component from which the spacers are composed to colouring agent/light screening agent component be from 10:0 to 3:7, from the point of view of providing the spacers with the desired load compression displacement.

As the process for forming the spacers, the method of applying unhardened resin onto the liquid crystal display element substrate and drying, after which patterning is carried out, is preferably employed in terms of being able to form spacers with high accuracy. In regard to the method for applying the unhardened resin, there is suitably employed the dipping method, roll coater method, spin coater method, die coating method, or method using a wire bar, etc, after which heating and drying (semi-curing) are carried out using an oven or hot plate. The semi-curing conditions will differ according to the resin and solvent employed, and the amount of resin applied but, normally, from 1 to 60 minutes heating at 60 to 200° C. is preferred. Exposure and development are carried out after first forming thereon a positive photoresist coating in the case where the resin in the resin coating obtained in this way is a non-photosensitive resin, or, in the case where the resin is a photosensitive resin, exposure and development are carried out either directly or after first forming an oxygen barrier film. The positive photoresist or oxygen barrier film is removed where required, and then heating and drying performed (the main cure). The main curing conditions will differ somewhat according to the type of resin and the amount applied but, in the case of a polyimide resin, normally the heating is carried out at 200 to 300° C. for 1 to 60 minutes. In the case of an acrylic resin, normally the main curing conditions comprise heating for 1 to 60 minutes at 150 to 300° C. By means of the aforesaid process, spacers are formed on the transparent substrate. In cases where it is difficult to obtain a sufficient height by patterning just once, it is possible to carry out the lamination of several resin layers.

Again, the spacers can also be formed by the so-called transfer method. This is a method in which a transfer film is prepared by forming on a base material a resin layer on which photosensitivity has been conferred, this then being superimposed on the substrate (with the application of heat and pressure where required), and exposure/development carried out, after which the base material is peeled away, forming spacers on the substrate.

The spacer shape, that is to say the cross-sectional shape when the spacer is sectioned in a plane parallel to the substrate is not particularly restricted, but circular, elliptical, polygonal with rounded corners, + shaped, T shaped or L shaped are preferred. Furthermore, even in the case where the spacers are formed by lamination, while the shape of the respective spacer layers is not particularly restricted, circular, elliptical, polygonal with rounded corners, + shaped, T shaped or L shaped are preferred, and the spacers may be formed by lamination of any of these.

The spacer height is preferably from 1 to 9 $\mu$m and more preferably from 2 to 6 $\mu$m. If the spacer height is less than 1 $\mu$m it becomes difficult to secure a sufficient cell gap. On the other hand, if it exceeds 9 $\mu$m the liquid crystal display device cell gap is too great, so the voltage required for driving becomes high, which is undesirable. Now, what is meant by spacer height here is, in terms of a single spacer, the distance between the uppermost surface of said spacer and the flat portion of the display area (in the case of a colour filter, the aperture region coloured layer, and in the case of a TFT substrate, the pixel electrode). In cases where there is a non-uniform height of flat portions in the display area on a substrate, it means the maximum distance from amongst the distances between the uppermost surface of the spacer and the display area flat portions.

From the point of view of enhancing the uniformity, within the screen, of the gap between the two liquid crystal display element substrates maintained by the spacers, it is preferred that spacers be formed both on the non-display regions within the screen and outside the screen but, depending on the circumstances, they may also be formed on the non-display regions either within or outside the screen.

The area per single spacer and the places where the spacers are arranged are greatly influenced by the structure of the liquid crystal display element substrate which faces this liquid crystal display element with fixed spacers, in the case of the production of a liquid crystal display device. Thus, where there are no restraints on the liquid crystal display element substrate with fixed spacers, there are no particular restrictions on the area per single spacer and the places they are arranged but, taking into consideration the area of non-display region per single pixel, the area per single spacer within the screen is preferably from 10 $\mu$m$^2$ to 1000 $\mu$m$^2$, more preferably 10 $\mu$m$^2$ to 250 $\mu$m$^2$. The spacer area referred to here is the area of the uppermost portion of the spacer, which is the part which contacts the facing substrate when the liquid crystal display device has been constructed. With an area less than 10 $\mu$m$^2$, precise pattern formation or lamination becomes difficult, while if the area is more than 1000 $\mu$m$^2$ then the alignment treatment based on thorough rubbing of the spacer periphery becomes difficult. Furthermore, in regard to the spacers within the screen, while it will also depend on the shape of the spacer portion, perfect arrangement on the non-display regions within the screen becomes difficult. On the other hand, the spacers outside the screen do not show themselves in the display region. Consequently, in the case of a liquid crystal display element substrate with spacers both within and outside the screen, the area per single spacer outside the screen will be preferably the same as, or greater than, the area per spacer within the screen so as to facilitate spacer formation.

The area, per single spacer, of that portion in contact with the facing substrate is preferably formed to be smaller than the area of the bottom portion of the spacer. If this spacer area is greater than the area of the spacer bottom portion, then the mechanical properties of the spacer may be lowered or fibres from the rubbing cloth may become entangled with the spacer at the time of rubbing, or again the spacer may break at the time of rubbing. Further, in the case of a liquid crystal display element substrate having spacers within and outside the screen, since it is preferred that, for those spacers lying outside the screen, the spacer area which contacts the opposing substrate be greater than or equal to the corresponding area of those spacers within the screen, the area of the lower portion of those spacers outside the screen is also preferably the same as or greater than the area, per single spacer, of the lower portion of the spacers within the screen from the point of view of the ease of spacer formation.

The arrangement density of the spacers is not particularly restricted but is preferably no more than 100 spacers per mm$^2$ at an arbitrary point within the screen, and more preferably no more than 50 per mm$^2$. If there are more than 100 spacers per mm$^2$, then, when rubbing is carried out with a wound roll of cloth in order to achieve liquid crystal alignment, the cloth strikes the spacers on the substrate and the rubbing is inadequately conducted, so sufficient liquid crystal alignment may not be achieved. Further, where there are more than 100 spacers per mm$^2$ within the screen, the number of spacers which must be formed per pixel is increased and so it is difficult to keep them to the non-display regions within the screen. Moreover, normally, in terms of liquid crystal display device design, no more than one spacer per pixel is preferred, so for this reason too it is preferred that there be no more than 50 spacers per mm$^2$. On the other hand, if the spacer arrangement density is too low, then the cell gap is inadequately maintained for the pixels lying away from the spacers and so, for example, the cell gap may change locally and display irregularities arise due to the coulomb fource caused by electric fields at the time of the driving of the liquid crystal display device. Consequently, too low a spacer arrangement density is not desirable and from 5 to 50 per $mm^2$ is preferred.

The positions of the spacers formed are not particularly restricted but, from the point of view of facilitating cell gap uniformity in the case where spacers are uniformly formed on a liquid crystal display element substrate, it is preferred that they be positioned at a specified period. In particular, it is preferred that they be positioned at a specified period in terms of the pixel pattern. Furthermore, within the non-display regions, it is not easy to form several spacers within one pixel. From this point of view, the number of arranged spacers is preferably no more than one per pixel and, consequently, the period of the spacer positioning is preferably of a longer period than that of the pixel pattern. Further, normally with liquid crystal display devices, the screen differs in length in the lengthwise and widthwise directions. Consequently, if the spacer position positioning periods are the same in the screen lengthwise and widthwise directions and a force of some kind is applied to the liquid crystal display device constructed using such a liquid crystal display element substrate, then the amount of liquid crystal display device strain will differ in the screen lengthwise and widthwise directions. If the extent of the strain differs in the screen lengthwise and widthwise directions, then the load applied to the spacers will be greater on either the lengthwise side or widthwise side of the screen, and so it is difficult to disperse the force uniformly over the spacers. Consequently, the spacers are preferably formed on the liquid crystal display element substrate so that their positioning period differs in the screen lengthwise and widthwise directions.

A transparent protective film may be formed before the spacer formation and/or after the spacer formation on the liquid crystal display element substrate. The provision of such a transparent film makes the construction of the liquid crystal display element substrate more complex and it is disadvantageous in terms of increasing costs. On the other hand, it is advantageous in terms of controlling the spacer height, preventing the transfer of impurities from the liquid crystal display element substrate surface, and flattening the surface and improving the physical properties, in particular the physical properties of the spacers, so whether such a film is used should be decided by consideration of the overall characteristics demanded.

In the case where a transparent protective film is applied following spacer formation, it is desirable that the thickness $t_D$ of the transparent film on the spacers and the thickness $t_S$ of the transparent film on the display region have the relation $t_S > t_D$. In this way, it is possible to regulate the spacer height.

Moreover, liquid crystal alignment faults may arise due to spacer indentations/protrusions. By making $t_S > t_D$, spacer indentations/protrusions are mitigated and it is possible to reduce the occurrence of liquid crystal alignment faults.

In the case where a transparent protective film is applied following the spacer formation, the thickness of the transparent film is preferably $0 \ \mu m \leq t_D \leq 1 \ \mu m$, and $0.05 \ \mu m \leq t_S \leq 3 \ \mu m$. Where $t_S$ is less than $0.05 \ \mu m$, its function as a protective film is unsatisfactory. Further, if there is provided a transparent film of thickness more than $1 \ \mu m$ on the spacers or more than $3 \ \mu m$ on the pixels, then problems may arise in that the lower regions of the transparent film layer from a spacer will have an effect extending into the display region (the film thickness will be changed due to the covering of the spacer with the transparent film), and so bring about display faults, or alignment faults will arise due to the spacers at the time of the alignment layer rubbing, causing display faults in the liquid crystal display device.

Now, in regard to the composition of the transparent resin which comprises the raw material for the transparent film, there can be used acrylic resin, epoxy resin, silicone resin or polyimide resin, etc, but there is no restriction to these. Further, the yield value of the transparent resin composition is desirably no more than 0.1 Pa from the point of view of ensuring levelling properties.

$t_S$ and $t_D$ can be measured, for example, by observation of the liquid crystal display element cross-section with an electron microscope.

In the case of a colour liquid crystal display device, from the point of view of the ease of formation of the spacers, a colour filter which is a liquid crystal display element substrate containing colouring agent is preferred as the liquid crystal display element substrate with the fixed spacers.

Below, the present invention is explained in further detail taking as an example the case where the liquid crystal display element substrate is a colour filter containing colouring agent.

Preferably, the colour filter is one where a black matrix is provided, where required, on a transparent substrate and then a plurality of coloured layers comprising three primary colours is arranged thereon. Pixels covered by coloured layers comprising each of three primary colours constitute one picture element and the colour filter is composed of numerous such picture elements. Here, black matrix refers to the light screening region arranged between each pixel, and it is provided in order to enhance the display contrast of the liquid crystal display device.

There are no particular restrictions on the transparent substrate used for the colour filter, and there can be favourably employed inorganic glasses such as silica glass, borosilicate glass, aluminosilicate glass and sodalime glass the surface of which has been silica coated, or an organic plastic film or sheet, etc.

On this transparent substrate, the black matrix is provided. The black matrix may be formed with a metal such as chromium or nickel, or oxide thereof, etc, but the formation of a resin black matrix comprising resin and light screening agent is preferred in terms of production cost and the cost of waste materials treatment. Further, it is also preferred in terms of increasing the spacer height. In such circumstances, there are no particular restrictions on the resin employed in the black matrix, but photosensitive or non-photosensitive materials such as epoxy resins, acrylic resins, urethane resins, polyester resins, polyimide resins and polyolefin resins are preferably used. The black matrix resin is preferably resin with a higher heat resistance than the resin used for the pixels or protective film, and furthermore there is preferably used a resin with resistance to the organic solvent employed in stages following black matrix formation. Hence, a polyimide resin is particularly preferably used. As examples of preferred polyimide resins, there are the aforesaid resins employed in spacer formation.

In regard to the light screening agent for the black matrix, as well as carbon black, metal oxide powders like titanium oxide and iron tetraoxide, metal sulphide powders and metal powders, there can also be used mixtures of red, blue and green pigments, etc. From amongst these, carbon black is outstanding in its light screening property and is particularly preferred. Readily-dispersible small particle size carbon black primarily has a brownish colour tone, so it is preferred that it be made achromatic by the mixing of a pigment of complementary colour to the carbon black.

In the case where the resin for the black matrix is a polyimide, there is normally employed as the black paste solvent an amide type polar solvent such as N-methyl-2-pyrrolidone, N,N-dimethylacetamide or N,N-dimethylformamide, or a lactone type polar solvent such as γ-butyrolactone, etc.

As an example of the method used for dispersing the light screening agent such as carbon black and complementary colour pigment to carbon black, etc, there is the method of mixing the screening agent, dispersing agent, etc, in the polyimide precursor solution and then performing dispersion using a dispersion machine such as a triple roll colour mill, sand grinder or ball mill, etc, but there is no particular restriction to this method. Further, various additives may also be added in order to raise the dispersibility of the carbon black or to enhance the coating or levelling properties.

As the method for producing the resin black matrix, the black paste is applied onto the transparent substrate and dried, after which patterning is carried out. For the application of the black paste, there can be suitably employed the dipping method, roll coater method, spin coater method, die coating method or method based on a wire bar, etc, after which heating and drying are carried out using an oven or hot plate (semi-curing). The semi-curing conditions will differ according to the resin and solvent used, and the amount of paste applied but, normally, heating for 1 to 60 minutes at 60 to 200° C. is preferred.

Exposure and development of the black paste coating obtained in this way are carried out after first forming thereon a positive photoresist coating in the case where the resin is a non-photosensitive resin, or, in the case where the resin is a photosensitive resin, the exposure and development are carried out either directly or after first forming an oxygen barrier film. After removing the positive photoresist or oxygen barrier film where required, heating and drying (the main cure) are then carried out. The main curing conditions, in the case where a polyimide resin is to be obtained from a precursor, will differ somewhat according to the amount of material applied but, normally, heating at 200 to 300° C. for from 1 to 60 minutes is usual. In the case of an acrylic resin, the main curing conditions normally comprise heating at 150 to 300° C. for from 1 to 60 minutes. By means of the above process, the black matrix is formed on the transparent substrate.

Further, the resin black matrix can also be formed by the so-called transfer method. This is a method in which a transfer film is prepared, which comprises a black layer on which photosensitivity has been conferred formed on a base material, and then this is superimposed on the substrate (with the application of heat and pressure where required), and exposure/development carried out, after which the base material is separated away, leaving resin black matrix on the substrate.

The film thickness of the resin black matrix is preferably from 0.5 to 2.0 μm, and more preferably from 0.8 to 1.5 μm. If the film thickness is less than 0.5 μm then, where the spacers are produced by the lamination of resin layers on the resin black matrix, it becomes difficult to form spacers of sufficient height. Moreover, this is also undesirable in that the light screening property is inadequate. On the other hand, if the thickness of the film is more than 2.0 μm, then, while it is possible to ensure light screening, the colour filter flatness tends to be sacrificed and differences in level are readily produced.

The light screening property of the resin black matrix is expressed by the OD value (common logarithm of the reciprocal of the transmittance), and in order to enhance the display quality of the liquid crystal display device this is preferably at least 2.5, and more preferably at least 3.0. Again, with the ideal range for the film thickness of the resin black matrix being as stated above, the upper limit of the OD value should be determined in relation thereto.

In regard to the reflectance of the resin black matrix, for the purposes of lowering the influence of reflected light and enhancing the display quality of the liquid crystal display device, it is preferred that the spectral luminosity-compensated reflectance (Y-value) in the 400 to 700 nm visible region be no more than 2%, and more preferably 1% or less.

Within the resin black matrix, normally (20 to 200)μm× (20 to 300)μm apertures are provided, and coloured layers of three primary colours respectively are provided so as to at least cover these apertures. That is to say, one aperture is covered by a coloured layer of any one of the three primary colours and there are arranged a plurality of coloured layers of each colour.

In the case of a colour filter, the coloured layers comprise at least three layers of three primary colours red (R), green (G) and blue (B), or cyan (C), magenta (M) and yellow (Y), and at each pixel there is provided a coloured layer of any one of these three colours.

Organic pigments, inorganic pigments and dyestuffs, etc, are suitable as the colouring agents employed in the coloured layers, and various additives such as ultraviolet absorbers, dispersing agents and levelling agents may also be added. In regard to pigments, there are generally used, as red (R), Colour Index No. 9, 97, 122, 123, 149, 168, 177, 180, 192 and 215, etc; as green (G), Colour Index No. 7 and 36, etc; and as blue (B), Colour Index No. 15, 22, 60 and 64, etc. As dispersing agents, there can be employed wide-ranging materials such as surfactants, pigment intermediates, dyestuffs intermediates and "Solsperse", etc.

There are no particular restrictions on the resins employed in the coloured layers, but photosensitive or non-photosensitive materials such as epoxy resins, acrylic resins, urethane resins, polyester resins, polyimide resins and polyolefin resins, etc, are desirably used. For the purposes of spacer formation, from the point of view of the afore-described mechanical properties, epoxy resins, acrylic resins and polyimide resins are preferred, with the polyimide resins being more preferred.

In regard to the method of forming the coloured layers, application is carried out onto the substrate on which the black matrix has been formed, followed by drying and then patterning. As an example of the method employed for dispersing or dissolving the colouring agent and obtaining the coloured paste, there is the method of mixing the resin and colouring agent in a solvent, after which dispersion is effected in a dispersing machine such as a triple roll colour mill, sand grinder or ball mill, etc, but there is no particular restriction to this method.

In the same way as for the black paste, there is suitably employed as a method for applying the coloured paste, the dipping method, roll coater method, spin coater method, die coating method, or method using a wire bar, etc, after which heating and drying (semi-curing) are carried out using an oven or hot plate. The semi-curing conditions will vary with the resin used, the solvent and the amount of paste applied but, normally, heating at 60 to 200° C. for 1 to 60 minutes is preferred.

The coloured paste coating obtained in this way is then subjected to exposure and development, in the case where the resin is a non-photosensitive resin, after first forming a positive photoresist coating on top, and, in the case where the resin is a photosensitive resin, either directly, or after first forming an oxygen barrier film. Where required, the positive photoresist or oxygen barrier layer is removed, and heating and drying (the main cure) carried out.

In regard to the main cure conditions, in the case of obtaining a polyimide resin from a precursor, while it will vary somewhat depending on the amount applied, normally heating is carried out at 200 to 300° C. for 1 to 60 minutes. In the case of an acrylic resin, normally the main curing conditions comprise heating for 1 to 60 minutes at 150 to 300° C. By means of the above process, a patterned coloured layer is formed on the substrate on which the black matrix has been formed. Further, the coloured layer may also be formed by the so-called transfer method.

Having formed a coloured layer of the first colour over the entire face of the substrate on which the black matrix has been formed, as described above, the unnecessary parts are removed by photolithography, to form the desired pattern of coloured layer of the first colour. The same procedure is repeated with the second and third colours and the colour filter formed.

In the case where spacers are formed on the colour filter, because of the need otherwise for a process to form the spacers, it is preferred that the spacers be composed of colour filter coloured layers and that the spacers be produced at the same time as the coloured layer formation. The spacers can be composed of one, two or three coloured layers. In the case where the spacers are composed of one coloured layer, the spacers comprise a single colour of resin containing colouring agent, and in the case where the spacers are composed of two or three layers, the spacers are formed by colour superposition of resins containing colouring agent. For example, when forming a desired first coloured layer pattern with the first coloured layer on the substrate on which the black matrix has been formed as described above, coloured layer is left in those regions where, at least, the apertures in the black matrix are to be covered, and also in those regions where the spacers are to be formed by lamination of the coloured layers. It is preferred that the formation of the coloured layers be carried out such that, by repeating the same procedure with the second and third colours, one coloured layer in each case remains on the apertures in the black matrix and, as spacers, ideally three coloured layers remain to secure a sufficient cell gap.

Again, in the case of a colour filter having a black matrix, it is preferred, from the point of view of ensuring a sufficient cell gap, that spacers be formed by the lamination of one, two or three coloured layers on the black matrix which constitutes the non display regions.

Moreover, in cases where a sufficient height is not obtained by the lamination of the coloured layers, it is possible to form the spacers by separate lamination of the aforesaid resin layers.

Along with the spacer formation, there may also be formed laminates of a height which do not function as a spacer. For example, where the spacers are formed from three coloured layers, these laminates are formed from two coloured layers or one coloured layer, and where the spacers are formed from two coloured layers, these laminates are formed from one coloured layer. Under normal circumstances, these do not come into contact with the facing liquid crystal display element substrate, but when the liquid crystal display device is subjected to an extremely high impact, etc, they then contact the facing substrate and, in so-doing, maintain a cell gap and can thereby raise the reliability of the display quality of the liquid crystal display device.

Where spacers are formed by the lamination of coloured layers, it is preferred that the weight ratio of the resin component to the colouring agent component in the coloured layers from which the spacer is composed be from 3:7 to 9:1 in terms of providing the spacer with the desired load compression displacement, and in terms of providing the desired spacer height, and again in terms of providing the colour filter with the desired colour display performance.

The coloured layer on an aperture and the coloured layer forming a spacer may be continuous or they may be separate. Indeed, in the case where an electrical circuit between the colour filter side and the facing substrate is to be prevented by electrical disconnection, between spacer and coloured layer on the aperture, of the indium tin oxide (ITO) formed on the colour filter as a transparent electrode, it is preferred that the coloured layer forming the spacer and the coloured layer on the aperture be separated and kept apart.

Figure 4:
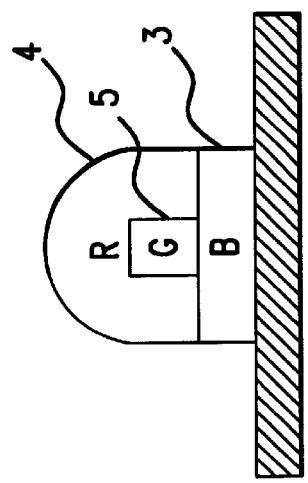
FIG. 4: is a cross-sectional schematic of the spacer shape in the colour filter described in Example 4.
Figure 3:
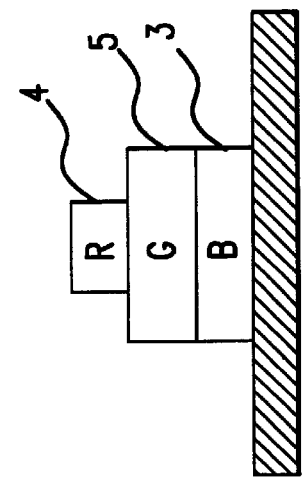
FIG. 3: is a cross-sectional schematic of the spacer shape in the colour filter described in Example 1.

In the case in the present invention of a colour filter having spacers which are formed by the lamination of coloured layers comprising three primary colours, at the time of the pattern lamination it is preferred that the lamination be carried out such that the area of the part which contacts the facing substrate is smaller than the area of the spacer bottom region, as shown in FIG. 3 or FIG. 4.

Figure 5:
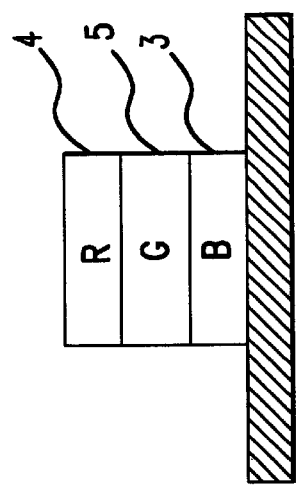
FIG. 5: is a cross-sectional schematic of the spacer shape in the colour filter described in Comparative Example 4.

In particular, it is preferred that the above structure be adopted in the case of the formation of spacers where the area of the part contacting the facing electrode is 200 $\mu m^2$ or less. This is because, when the pattern size is small, if an attempt is made to form spacers by the lamination of three layers of the same pattern size as shown in FIG. 5, then, in addition to the fact that accurate superpositioning of the three layers is difficult, there is the disadvantage that the rubbing resistance is lowered and the spacer strength is weakened.

As means for the formation of spacers with the aforesaid structure, broadly speaking the following two means can be considered.

Firstly, as shown in FIG. 3, there is the structure where the area of the pattern laminated as the uppermost spacer layer has a smaller pattern area than those provided as the second and first layers. Secondly, as shown in FIG. 4, there is the structure where the area of the pattern laminated as the uppermost layer of the spacer is greater than the area of the pattern provided as the second or the first layers, so that it forms a shape covering the spacer patterns forming the lower layers.

In the case where the first structure is adopted, since the area of the pattern laminated as the spacer second layer is large, the film thickness of the coloured film laminated as the third layer can readily be increased and a spacer of sufficient height can easily be obtained. Furthermore, there is the advantage that since the contact with the facing substrate side is in a level plane, the area of the region of contact can easily be estimated or measured, and so design and evaluation of the spacer structure is easy. In the case where the second structure is adopted, since the pattern of the uppermost layer laminated portion is greater in area than the pattern provided for the lower layer portions, in the process of pattern formation by photolithography the border between the mask pattern light screening and non-light screening regions lies at a region where one or two coloured layers is/are laminated. This is a region where the coloured film or resist film thickness is close to the film thickness of the stripe region, so the etching rate for the spacer regions and the pixel pattern regions at the apertures become comparatively close, and so a stabilization of the processing conditions can be realized and processing accuracy is enhanced.

Furthermore, with this structure, there is the advantage that it is possible to give the portion which contacts the facing electrode a smooth convex shape, so it is possible to prevent facing electrode damage.

The locations where the spacers are formed are preferably on the non-display regions corresponding to the colour pixels covered with a specified colour from amongst the three primary colours. Still more desirably, it is further preferred that said specified colour be the colour first applied. In the case of the formation of spacers based on the lamination of three primary colours, the thickness of the coloured layer finally laminated on the spacer region will differ according to differences in the state at the time, that is to say whether or not the colour pixel aperture corresponding to the location where the spacer is to be formed is already covered with a coloured layer. Specifically, in regard to a spacer formed on a non-display region corresponding to a colour pixel covered by the third coloured layer, here the film thickness of the coloured layer provided as the uppermost layer by the third colour will be reduced because of the considerable amount of film coating flowing into the aperture, while in the case of a spacer formed on a non-display region corresponding to a colour pixel covered by the first or second coloured layers, since the aperture is already covered by the coloured layer there is little such inflow of film coating into the aperture, and so the film thickness of the coloured film laminated as the third colour on the spacer is thicker. Consequently, in the case of the spacers formed on non-display regions corresponding to the colour pixels covered by coloured film of the third colour, it is more difficult to achieve height when compared to the spacers formed on the non-display regions corresponding to colour pixels covered by the coloured films of the first or second colour. In particular, in the case where the spacers are formed on the black matrix, because of the increase of flow corresponding to the thickness of the black matrix into the apertures, it is difficult to achieve height when compared to the spacers formed on the black matrix corresponding to colour pixels covered by the first or second coloured layers. Hence, since spacers where insufficient height has been attained do not adequately carry out their function as spacers, the load is concentrated on the remaining spacers, leading to spacer failure or display faults in the liquid crystal display device.

Here, reference to spacers formed on non-display regions corresponding to a specified colour pixel means spacers formed on non-display region areas within pixel units where the aperture is covered by said specified colour, and it includes spacers formed on the non-display regions corresponding to colour pixels of said specified colour where a portion exceeding 50% of the spacer area is present on said non-display region.

In the case where a photosensitive coloured film is used, the etching rate will differ due to differences in the film thickness of the coloured layer provided as the uppermost layer of the spacer portion, so variations in the spacer size within the screen will tend to increase. Even where a non-photosensitive coloured film is used, when the photoresist used for the purposes of patterning is applied, then, for the same reason, the etching rate will still differ because of differences in the resist film thickness on the spacer upper layer region due to the spacer arrangement position, and variations in the spacer size will arise. Hence, from the point of view of reducing variations in the spacer size, it is desirable that the spacers be arranged on the black matrix to correspond to specified colour pixels.

Thus, in order to form spacers with little variation in height and area by colour superposition, spacer formation should be avoided on the black matrix corresponding to colour pixels where the aperture is to be covered by the third colour, and the spacers are desirably formed on the black matrix corresponding to colour pixels covered by the first or second colours, more preferably on the non-display regions corresponding to colour pixels covered by either the first or the second colours.

In regard to the uppermost coloured layer from which the spacer is composed, it is preferred that the taper angle of the spacer uppermost layer portion $\theta_d$ and the taper angle $\theta_s$ of the stripe portion from which the pixel region is formed have the following relation.

$$90° \geq \theta_d > \theta_s$$

Alternatively, where required, this relationship can be satisfied by providing a transparent protective film, as explained before. If the structure is such that the taper angle of the uppermost coloured layer from which the spacer is constructed is made steeper than that of the pixel region of said coloured layer, then the pattern side of the uppermost layer from which the spacer is constructed rises steeply, so an ITO film is divided at the spacer portion and it is possible to avoid the danger of electrical shorting, via the ITO on the spacer, between the transparent (common) electrode on the colour filter and the transparent electrode or circuit on the active matrix substrate side. As well as ensuring good voltage retention, rubbing of the liquid crystal alignment layer may be carried out uniformly on the pattern side region of the coloured layer stripe forming the pixel region, and a liquid crystal display device is obtained having good display characteristics where no liquid crystal alignment faults are produced.

Above, explanation has primarily been given taking, as an example, the case where the liquid crystal display element substrate is a colour filter, but the present invention is not to be restricted thereto and may be of any kind providing it is a liquid crystal display element substrate. For example, it may be a substrate like a TFT substrate having a number of thin film transistors. In the case of a TFT substrate, the spacers are formed on non-display regions between pixel electrodes. The aforesaid explanations of the spacer structural materials, shape, height and cross-sectional area, etc, will apply in the same way to the case of a TFT substrate. In regard to the spacer structural materials, the materials employed at the time of TFT production can be employed and freely laminated on the substrate. For examples, a passivation film, etc, may be used.

Next, explanation is provided of a colour liquid crystal display device constructed using the aforesaid colour filter and a TFT substrate. In FIG. 1, a cross-section of a preferred embodiment of said colour liquid crystal display device is shown schematically. As illustrated in FIG. 1, the liquid crystal display device is constructed by bringing together the aforesaid colour filter and transparent electrode substrate so that they face one another. A transparent protective film may be provided on the coloured layers of the colour filter where required. Moreover, where required, transparent electrodes such as ITO films are formed on the colour filter. As the transparent electrode substrate facing the colour filter, transparent electrodes such as ITO films are provided on a transparent substrate by patterning. Besides transparent electrodes, there can also be provided, on the transparent electrode, substrate TFT elements, thin film diode (TFD) elements and scanning lines and data lines, etc, to produce a TFT liquid crystal display device substrate or TFD liquid crystal display element device. On the colour filter with transparent electrodes and on the transparent electrode substrate, a liquid crystal alignment layer is provided, and an orientation treatment based on rubbing, etc, carried out. Following the orientation treatment, the colour filter and the transparent electrode substrate are stuck together using a sealing agent, and after introducing the liquid crystal from an injection port provided in the seal region, end-sealing of the injection port is performed. After affixing a polarizer to the outside of the substrate, the module is completed by mounting an IC driver, etc. In the case of liquid crystal display devices not provided with transparent electrodes on the colour filter side, for example in the case an in-plane switching mode (IPS) system, a structure corresponding to this is formed.

With the liquid crystal display element substrate of the present invention, since the load compression displacement of the spacers lies within a specified range, when a liquid crystal display device is constructed using this substrate there is the effect that the lowering of the display quality caused by change in the cell gap is prevented and the generation of bubbles when the temperature is low is reduced.

The liquid crystal display element substrate of the present invention and the liquid crystal display device employing it may be used for the display screens of personal computers, word processors, engineering work stations, navigation systems, liquid crystal televisions, videos and the like, and they are also suitable for use in liquid crystal projection, etc. Further, in the fields of optical communication and optical data processing, they are suitable for use as a spatial light modulator employing liquid crystals. A spatial light modulator is a means for modulating the intensity, phase or polarizing angle, etc, of light incident on the element, in accordance with input signals to the element, and it may be employed in real time holography, or as a spatial filter, or in incoherence/coherence conversion, etc.

Below, explanation is provided by means of examples and comparative examples, but these are for exemplification only and are not to restrict the interpretation of the invention. The essentials of the conditions and results are shown in Table 1 at the end.

EXAMPLE 1
(1) Production of the Resin Black Matrix, Seal Region Pattern and Screen Exterior Spacer Pattern 3,3',4,4-biphenyltetracarboxylic dianhydride, 4,4'-diaminodiphenyl ether and bis(3-aminopropyl)tetramethyldisiloxane were reacted together in N-methyl-2-pyrrolidone solvent, and a polyimide precursor (polyamic acid) solution of polymer concentration 20 wt % obtained.

A black paste was prepared by dispersion of a carbon black mill base of the following composition using a homogenizer for 30 minutes at 7000 rpm, and filtering off the glass beads.

Carbon Black Mill Base

Carbon black (MA100, produced by Mitsubishi Kagaku K.K.)

| Carbon black (MA100, produced by Mitsubishi Kagaku K.K.) | 4.6 parts |
|---|---|
| Polyimide precursor solution | 24.0 parts |
| N-methylpyrrolidone | 61.4 parts |

Using a spin coater, the black paste was applied onto an alkali-free glass (produced by Nippon Denki Glass K.K., OA-2) substrate of size 300×350 mm, and semi-cured for 20 minutes at 135° C. in an oven. Next, a positive resist (Shipley "Microposit" RC100 30 cp) was applied with a spin coater, and drying conducted for 10 minutes at 90° C. The resist film thickness was 1.5 $\mu$m. Using an exposure means, exposure was carried out through a photomask.

Next, using an aqueous solution containing 2 wt % tetramethylammonium hydroxide at 23° C. as the developer liquid, the substrate was dipped in the developer liquid and, at the same time, the substrate was moved backwards and forwards over a range of 10 cm, with one forward/backward movement taking 5 seconds, so that development of the positive resist and etching of the polyimide precursor were carried out simultaneously. The development time was 60 seconds. Subsequently, the positive resist was separated away with methyl cellosolve acetate, and then curing carried out for 30 minutes at 300° C., so that conversion to the polyimide was effected, and the resin black matrix substrate obtained. The film thickness of the resin black matrix was 1.1 $\mu$m.

(2) Production of the Coloured Layers and Spacers

Next, as red, green and blue pigments, the di-anthraquinone type pigment denoted by Colour Index No. 65300, Pigment Red 177, the phthalocyanine green type pigment denoted by Colour Index No. 74265, Pigment Green 36, and the phthalocyanine blue type pigment denoted by Colour Index No. 74160, Pigment Blue 154, were respectively prepared. Polyimide precursor solution and each of the aforesaid pigments were mixed and dispersed together at a weight ratio (polyimide precursor:pigment) of 6:4, so that three-types of coloured paste, red, green and blue, were obtained.

Firstly, the blue paste was applied onto the resin black matrix substrate, then hot-air dried for 10 minutes at 80° C., and semi-cured for 20 minutes at 120° C. Subsequently, a positive resist (Shipley "Microposit" RC100 30 cp) was applied with a spin coater, after which drying was carried out for 20 minutes at 80° C. Exposure was carried out using a mask, then the substrate dipped in alkali developer liquid (Shipley "Microposit" 351) and while at the same time moving the substrate backwards and forwards, development of the positive resist and etching of the polyimide precursor were carried out simultaneously. Thereafter, the positive resist was separated away with methyl cellosolve acetate, and curing carried out for 30 minutes at 300° C. The film thickness of the colour pixel portion was 2.2 $\mu$m. By this patterning, along with the formation of the blue pixels, the first layer of the spacers was formed on the resin black matrix using a 25 $\mu$m×20 $\mu$m rectangular photomask pattern.

After washing with water, in the same way, as well as forming the green pixels, the second layer of the spacers was formed on the resin black matrix using a photomask pattern of the same size as for the first. The film thickness of the green pixel portion was 2.2 $\mu$m.

Again, after water washing, in the same way, as well as forming the red pixels, the third layer of the spacers was formed on the resin black matrix using a 15 $\mu$m×10 $\mu$m rectangular photomask pattern, to produce the colour filter. The film thickness of the red pixel portion was 2.2 $\mu$m.

The area of the spacer bottom portion, that is to say the blue portion, provided on the resin black matrix by the lamination of the coloured layers, was about 500 $\mu$m$^2$ per spacer, and the area of the portion which comes into contact with the facing substrate was 120 $\mu$m$^2$, taken as an average of 9 points within the screen. Further, the size variation of the spacer patterns was 3 $\mu$m based on the 3σ value, for both the short and long sides on the uppermost layer pattern. When the thickness of the black matrix and the three coloured layers was measured at nine points within the screen by the probe method, the average value was 6.90 μm and the variation was 0.3 μm based on the 3σ value. The thickness of the three coloured layers on the resin black matrix was 5.80 μm, and this was less than the total of the film thicknesses of each coloured layer (6.6 μm). The spacer height from the aperture coloured film surface to the spacer uppermost layer portion was about 4.7 μm. The spacers were provided periodically within the screen at a rate of 1 per pixel. That is to say, they were provided periodically at specified positions at a rate of 1 per 100 μm×300 μm rectangular shape range within the screen. Further, the spacer shape was essentially elliptical. Again, at the screen periphery, spacers were provided by colour superposition on the picture frame formed by resin black matrix. At this time, the area of the uppermost layer was made to be twice that of the spacers within the screen, while the number of spacers per unit area was made ½, and so the spacer contact area with the facing substrate, per unit area, was made the same as that within the screen. Furthermore, in the same way as within the screen, by the overlap of a pattern of the resin layer used in the production of the resin black matrix and resin layer patterns used in the preparation of the coloured films, spacers were formed on the substrate outside the frame at the same time as the production of the spacers within the screen and the colour filter. Here, the area of contact between the spacer and the facing substrate, per unit area, was made to be the same as that within the screen.

By forming an ITO film by the sputtering method on this alkali-free glass substrate with a light screening layer and red, green and blue pixels, and having spacers on the resin black matrix of the display screen region and frame or frame peripheral seal region, a colour filter was obtained for use as a liquid crystal display element substrate. The thickness of the ITO film was 150 nm and the surface resistance was 20 Ω/□.

At this time, cross-sectional scanning electron micrographs of the colour filter produced were obtained, and the respective taper angles measured on the photographs. The spacer taper angle $\theta_D$ of the dot portion formed by the red coloured layer was 75° and the edge taper angle $\theta_s$ of the stripe portion of the red coloured layer pixel region was 45°. This satisfied $90° \geq \theta_D > \theta_s$.

(3) Measurement of the Load Compression Displacement

The compression displacement in response to a load was measured using a microcompression tester (Shimadzu Corp., MCTE-500) for one of the spacers formed (height 4.7 μm). The test conditions were a loading rate of 0.892 mN/S and a maximum load of 60 mN. When, following 60 mN loading, the area of the spacer uppermost layer flattened region was measured using an optical microscope, it was 110 μm². Consequently, the compression stress at this time was 0.55 GPa. The displacement produced at the time of 60 mN loading was 1.2 μm. Thus, by dividing the displacement produced at the time of 60 mN loading by the load, the load compression displacement of this spacer was 0.020 μm/mN.

(4) Measurement of the Spacer Elastic Restitution Factor

The elastic restitution factor for one of the spacers formed was measured using a microcompression tester (Shimadzu Corp., MCTE-500). The test conditions were as follows: the loading (unloading) rate was 2.582 mN/s, the compression load at the time of loading→unloading changeover $F_2$ was 60 mN, and the final compression load F1 at the time of unloading was 5 mN. When, after 60 mN loading, the area of the spacer uppermost layer flattened region was measured using an optical microscope, it was 128 μm². Consequently, the compression stress at this time was 0.5 GPa. The compression displacement La at the final compression load F1 at the time of loading was 0.2, the displacement Lc at the time of the loading→unloading changeover was 1.12 μm, and the displacement Lb at the time of the final compression load of 5 mN during unloading was 0.62 μm. By introducing these values into the numerical formula [I] above, the calculated elastic restitution was 54%.

(5) Measurement of the Compression Failure Strength

The failure strength for a compression stress was measured for one of the spacers formed, using a microcompression tester (Shimadzu Corp., MCTE-500). The test condition was a loading rate of 2.582 mN/S. Failure did not occur up to 90 mN but with a force above this cracks were produced in the spacer (cracking of the spacer base). When, following 90 mN loading, the area of the spacer uppermost layer flattened region was measured using an optical microscope, it was 125 μm². The spacer failure strength was determined by dividing the load at which cracks were produced (90 mN) by this area (125 μm²), and was found to be 0.77 GPa.

(6) Measurement of the Thermal Expansion Coefficient of the Spacer

Part of the colour filter in which spacers had been formed was cut out, and an optical flat set on a spacer, to produce a sample for measuring the thermal expansion coefficient. Light was directed from the colour filter side (back face) and the change in the interference fringes measured with a light interference meter when the temperature was varied between 25 and 50° C. The expansion coefficient was determined by calculation from the height of the spacer at 25° C. and the height at 50° C. As a result, the coefficient of thermal expansion of this spacer between 25 and 50° C. was 40 ppm/° C. Further, the paste for forming the resin black matrix, and the blue, red and green colour pastes, were respectively applied onto a silicon wafer which had treated with a release agent, then heated and dried, and curing carried out, so that coloured cured films of film thickness 2.0 μm were obtained. Onto these coloured cured films were respectively applied in each case the same coloured paste and, by the same procedure, lamination of the coloured cured films was performed. By repeating this procedure, coloured cured films of film thickness 10.0 μm were produced, after which the films were separated from the silicon wafer. When the coefficient of thermal expansion of the coloured cured films between 25 and 50° C. was measured in the film planar direction with a thermomechanical analyser, the average expansion coefficient for the four types of coloured cured film was 30 ppm/° C.

(7) Construction of the Colour Liquid Crystal Display Device and the Evaluation Thereof A polyimide type alignment layer was provided on the ITO film of the colour filter where these spacers had been provided, and a rubbing treatment conducted. Further, in the same way, a polyimide alignment layer was also provided on the facing liquid crystal display element substrate, and a rubbing treatment conducted. These two substrates were stuck together using an epoxy adhesive as the sealing agent, after which the liquid crystal was injected from an injection port provided in the seal portion. After injecting the liquid crystal, the injection port was closed, and by further affixing a polarizer to the outside of the substrate the liquid crystal display device was constructed.

The display quality of this liquid crystal display device was extremely good. The liquid crystal display device was observed directly and obliquely, but no display unevenness was noted. Further, it was left for 1 week at −40° C., but no occurrence of bubbles was noted. Again, when left for 1 week at −50° C., no occurrence of bubbles was noted.

Comparative Example 1

(1) Production of the Resin Black Matrix and Seal Region Pattern

The production of the resin black matrix and seal region pattern was carried out in the same way as in Example 1 using a black paste obtained by mixing and dispersing a solution of epoxy-silicone resin containing carboxyl groups, and carbon black, in the weight ratio 6:4.

(2) Production of the Coloured Layers and Spacers

Using the same procedure as in Example 1, red pixels and green pixels and blue pixels were formed employing three types of coloured paste, red, green and blue, obtained by mixing and dispersing a solution of epoxy-silicone resin containing carboxyl groups and red, green or blue pigments in respective ratios of 9:1 by weight and, at the same time, spacer formation was carried out on the resin black matrix of the display screen region and frame and frame peripheral seal region.

An ITO film was formed by the sputtering method on the substrate with these spacers, and a colour filter obtained as one liquid crystal display element substrate.

(3) Measurement of the Load Compression Displacement

When the load compression displacement was measured for one of the spacers formed (height 4.7 µm), by the same method as in the Example, it was 1.5 µm/mN.

(4) Construction of the Colour Liquid Crystal Display Device and the Evaluation Thereof A liquid crystal display device was constructed in the same way as in the Example 1. Stripy patches were produced along the closure region around the liquid crystal display device and a lowering of the display quality was confirmed.

EXAMPLE 2

(1) Production of the Resin Black Matrix and the Seal Region Pattern

Using the same procedure as in Example 1, the production of the resin black matrix and seal region pattern was carried out using a paste obtained by mixing and dispersing carbon black in a polyimide precursor solution.

(2) Production of the Coloured Layers and Spacers

Using the same procedure as in Example 1, red pixels and green pixels and blue pixels were formed using three types of coloured paste, red, green and blue, obtained by mixing and dispersing polyimide precursor solution and red, green and blue pigments respectively at a (polyimide precursor/pigment) weight ratio of 9:1 by weight, and, in the same way, spacer formation was carried out on the resin black matrix of the display screen region and frame and frame peripheral seal region.

An ITO layer was formed by the sputtering method on the substrate with these spacers, and a colour filter for use as a liquid crystal display element substrate was obtained.

(3) Measurement of the Load Compression Displacement

When the load compression displacement was measured for one of the spacers formed, by the same method as in Example 1, it was 0.5 µm/mN.

(4) Construction of the Colour Liquid Crystal Display Device and the Evaluation Thereof A liquid crystal display device was constructed in the same way as in Example 1. The display quality of this liquid crystal display device was good. When the liquid crystal display device was observed directly, no display unevenness was noted. When observed carefully in an oblique manner, slight display unevenness was noted but the lowering of display quality was not sufficient to be a problem. Again, when it was left for 1 week at –40° C., no occurrence of bubbles was noted. Further, when left for 1 week at –50° C., no occurrence of bubbles was noted.

EXAMPLE 3

(1) Production of the Resin Black Matrix and Seal Region Pattern

The production of the resin black matrix and seal region pattern was carried out by the same procedure as in Example 1 using a paste obtained by mixing and dispersing carbon black in a polyimide precursor solution.

(2) Production of the Coloured Layers and Spacers

Using the same procedure as in Example 1, red pixels and green pixels and blue pixels were formed using three types of coloured paste, red, green and blue, obtained by mixing and dispersing polyimide precursor solution and red, green and blue pigments respectively at a (polyimide precursor/pigment) weight ratio of 3:7 and, at the same time, spacer formation was carried out on the resin black matrix of the display screen region and frame and frame peripheral seal region.

An ITO layer was formed by the sputtering method on the substrate with these spacers, and a colour filter for use as a liquid crystal display element substrate was obtained.

(3) Measurement of the Load Compression Displacement

When the load compression displacement was measured for one of the spacers formed, using the same method as in Example 1, it was 0.002 µm/mN.

(4) Production and Evaluation of the Colour Liquid Crystal Display Device

A liquid crystal display device was produced in the same way as in Example 1. The display quality of this liquid crystal display device was good. When the liquid crystal display device was observed directly and obliquely, no display unevenness was noted. Further, it was left for 1 week at –40° C. but no occurrence of bubbles was apparent. Again, when left for 1 week at –50° C., the generation of a number of extremely small bubbles was noted but, because these only occurred in the non-display regions, there was no reduction in the display quality.

Comparative Example 2

(1) Production of a Metal Black Matrix and Seal Region Pattern

A light-screening film comprising chromium and oxide thereof was formed on a transparent substrate by a vacuum evaporation method. A photoresist was applied thereon, and a photoresist coating formed by heating and drying. This was exposed through a photomask using an ultraviolet exposure means, Following exposure, immersion in alkali developer was performed, and development of the photoresist carried out. Subsequently, etching of the light-screening film was carried out by means of an acid developer liquid and, following etching, the photoresist layer which was no longer required was peeled away, and the black matrix thereby produced.

(2) Production of the Coloured Layers and Spacers

Using the three types of coloured paste, red, green and blue of Example 3, and using the same procedure as in Example 1, red pixels and green pixels and blue pixels were formed. At this time, unlike in the Example 1, no spacer formation was carried out on the resin black matrix of the display screen region and frame and frame peripheral seal region.

(3) Production of Spacers

Spacers comprising silicon oxide film were formed on the black matrix by masking and sputtering.

An ITO layer was formed on the substrate with these spacers by a sputtering method, and a colour filter obtained to be used as a liquid crystal display element substrate.

(4) Measurement of the Load Compression Displacement

When the load compression displacement was measured for one of the spacers formed, by the same method as in Example 1, it was 0.0005 µm/mN.

(5) Measurement of the Elastic Restitution Factor

When the elastic restitution factor was measured for one of the spacers formed, by the same method as in Example 1, it was 90% at a compression stress of 0.5 GPa.

(6) Measurement of the Coefficient of Thermal Expansion

When the coefficient of thermal expansion was measured for one of the spacers formed, by the same optical method as in Example 1, it was 3 ppm/° C.

(7) Production and Evaluation of the Colour Liquid Crystal Display Device

A liquid crystal display device was produced in the same way as in the Example 1. Local display unevenness was produced and a lowering of the display quality was apparent.

Further, when the display device was left for 1 week at −40° C., bubbles occurred. Moreover, when left for 1 week at −50° C., the bubbles grew larger and the number increased.

Comparative Example 3

Using coloured pastes formed by dispersing and mixing red, green and blue pigments respectively in a carboxyl-group-containing epoxy-silicone resin at a ratio of resin/pigment=1/9 (weight ratio), and employing the same procedure as in the Example 1, spacers consisting of three layers of coloured film comprising pigment in an epoxy.silicone resin were formed on the resin black matrix. When the load compression displacement was measured by the same method as in the Example 1, the load compression displacement of one of the spacers (height 5 $\mu$m) was 1.2 $\mu$m/mN. Further, when the failure strength was measured by the same method as in the Example 1, the failure strength of a single spacer was found to be 0.07 GPa. When a liquid crystal display device was produced by the same procedure as in Example 1, display unevenness was shown and the display quality was reduced. When the liquid crystal display device was taken apart and the spacers examined in those regions where display unevenness had occurred, it was found that cracks had been produced in the spacers. Moreover, when those regions of the constructed liquid crystal display device where there was no display unevenness were firmly pressed with the finger, display unevenness was produced and did not disappear. In the same way, when the liquid crystal display device was taken apart and the spacers examined, cracks were found to have been produced in the spacers.

Comparative Example 4

A resin black matrix pattern was produced on a transparent alkali-free glass substrate by the same procedure as in Example 1. However, no spacer pattern was provided in the seal region and outside the screen. A pattern of blue, green and red coloured layers was then formed on the resin black matrix pattern by the same procedure as in Example 1. When a liquid crystal display device was produced using this colour filter, since spacers had not been provided outside the screen, cell gap unevenness was produced around the screen and display unevenness was apparent.

EXAMPLE 4

A resin black matrix pattern was formed on a transparent alkali-free glass substrate by the same procedure as in Example 1. Further, a pattern of blue, green and red layers was formed on the resin black matrix pattern. At this time, excepting that the spacer mask pattern comprised 25×20 $\mu$m rectangles for the first layer, 15×10 $\mu$m rectangles for the second layer and 25×20 $\mu$m rectangles for the third layer, the coloured layer patterns were formed by the same procedure as in Example 1. The variation in the spacer pattern size within the substrate was low, being 2 $\mu$m based on the 3$\sigma$ value, and no spacer losses due to overlap discrepancies, etc, were noted. Spacers were formed on the frame around the screen and on the glass substrate outside the screen in the same way as in Example 1.

When a liquid crystal display device was produced by the same procedure as in Example 1 using this colour filter, the cell gap was uniform and no display unevenness or other such display faults were apparent. A good display quality was obtained.

Comparative Example 5

A resin black matrix pattern was formed on a transparent alkali-free glass substrate by the same procedure as in Example 1. Furthermore, a pattern of blue, green and red coloured layers was formed on the resin black matrix. At this time, excepting that the spacer photomask pattern comprised 15×10 $\mu$m rectangles for the first, second and third layers, the coloured layer patterns were formed by the same procedure as in Example 1. As a result of overlap discrepancies, a sufficient height was not obtained, and some spacers were found to have an area of contact to the facing substrate of less than 40 $\mu$m². When a liquid crystal display device was produced using this colour filter, there was found to be considerable damage to the spacers at the time of rubbing. Further, since, in part, spacers were produced of insufficient height and area, it was not possible to obtain a sufficient spacer density, and spacer failure occurred at the time of panel production and cell gap unevenness was produced.

EXAMPLE 5

In the same way as in Example 1, a resin black matrix pattern was produced on an alkali-free glass substrate, and coloured layers also formed by the same procedure as in Example 1. However, spacers were only provided in the vicinity of the blue pixels, that is to say in those regions where there was superposition of the stripe-shaped blue coloured layer covering the blue pixel region and the black matrix, and the density thereof within the screen was 1 spacer per 1 blue pixel.

When the area of the spacers provided on the resin black matrix by coloured layer superposition was measured at 9 points within the screen, it was found to be an average of 120 $\mu$m² per spacer, and the variation within the screen was 40 $\mu$m² based on the 3$\sigma$ value. The thickness of the coloured layer three-layer region on the resin black matrix was 5.80 $\mu$m and this was lower than the total of the film thicknesses of each of the individual coloured layers (6.6 $\mu$m).

When the thickness of the black matrix and the coloured layer three-layer region was measured at 9 points within the screen by the penetrometer method, the average value was 6.90 $\mu$m and the variation was 0.15 $\mu$m based on the 3$\sigma$ value.

A liquid crystal display device was produced in the same way as in Example 1 obtained using the colour filter. The cell gap of the liquid crystal display device was uniform within the screen and a liquid crystal display device of good display quality which was free of display unevenness was obtained.

Comparative Example 6

Figure 8:
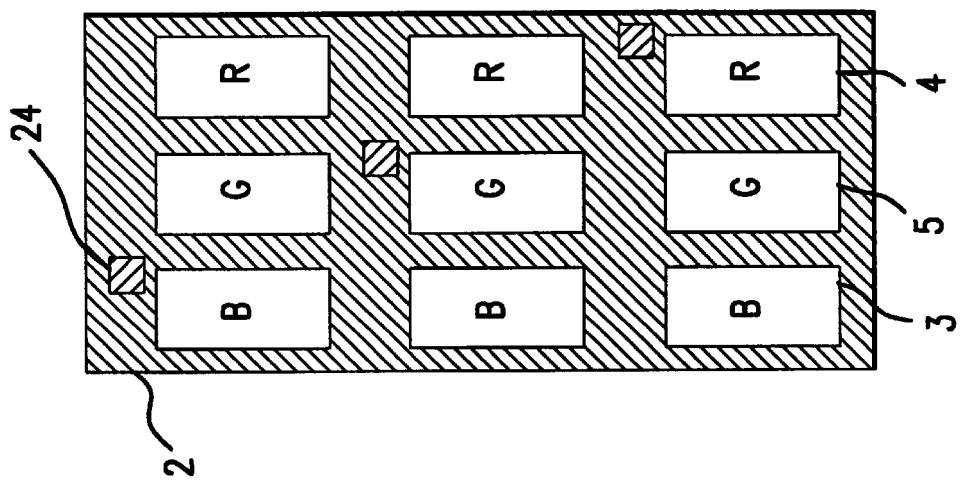
FIG. 8: is a schematic plan view showing the arrangement of spacers on the colour filter described in Comparative Example 6.
Figure 7:
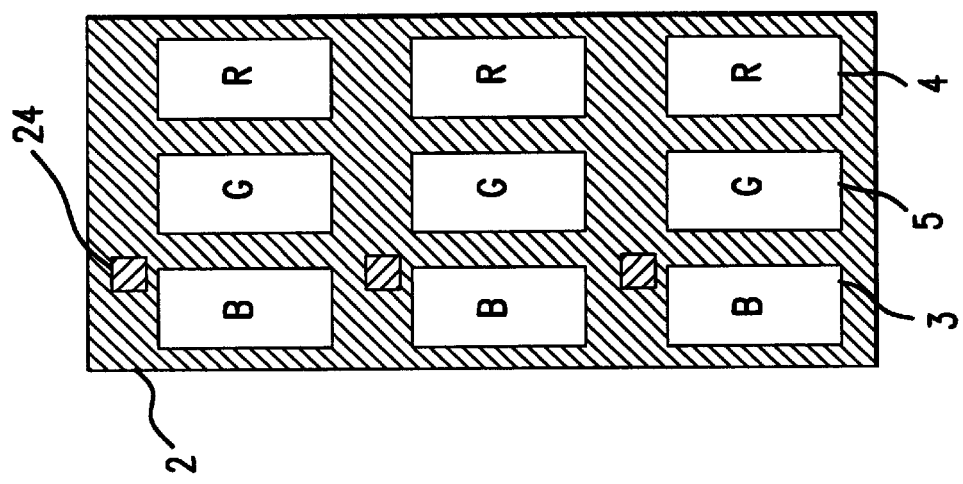
FIG. 7: is a schematic plan view showing the arrangement of spacers on the colour filter described in Example 5.
Figure 6:
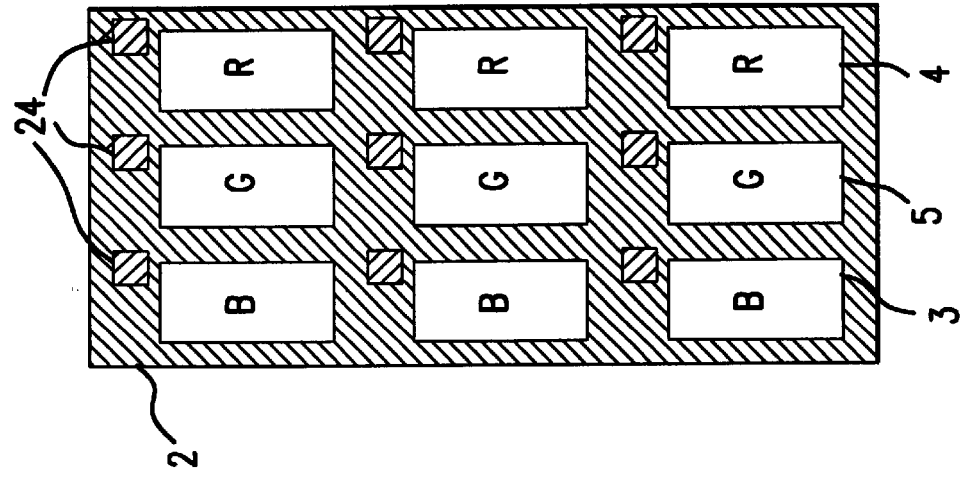
FIG. 6: is a schematic plan view showing the arrangement of spacers on the colour filter described in Example 1.
Figure 9:
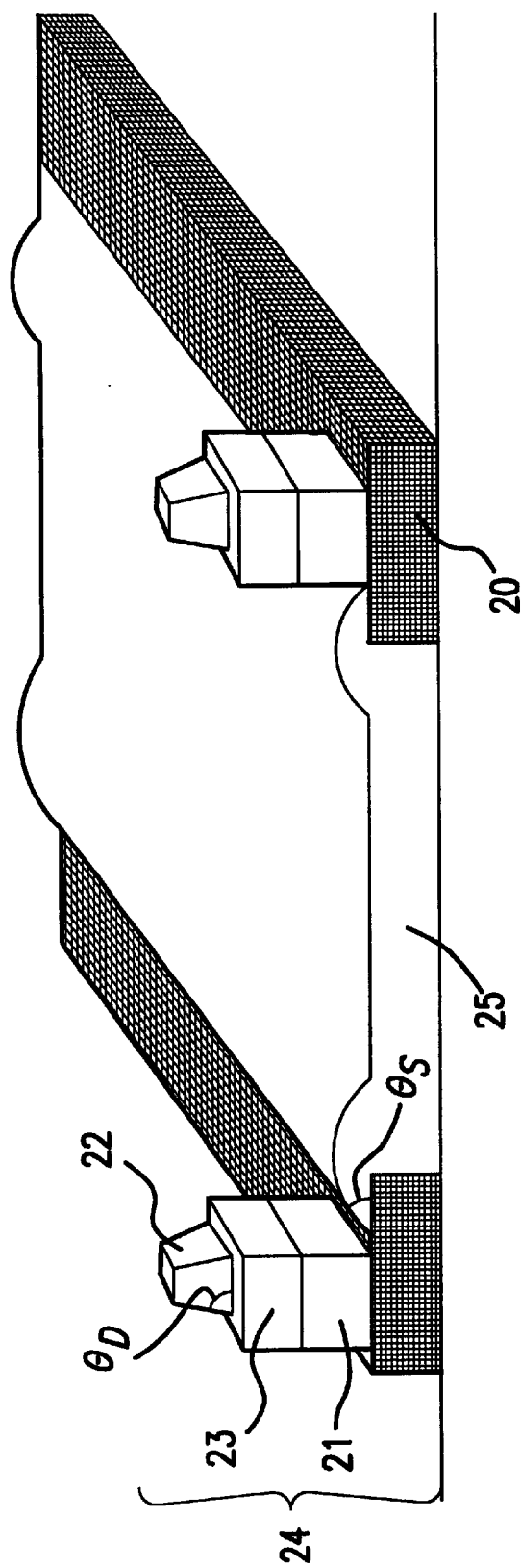
FIG. 9: is a diagram showing schematically the uppermost coloured layer and the dot-form spacer shape in a colour filter of the present invention, and the various angles relating to the invention.
Figure 10:
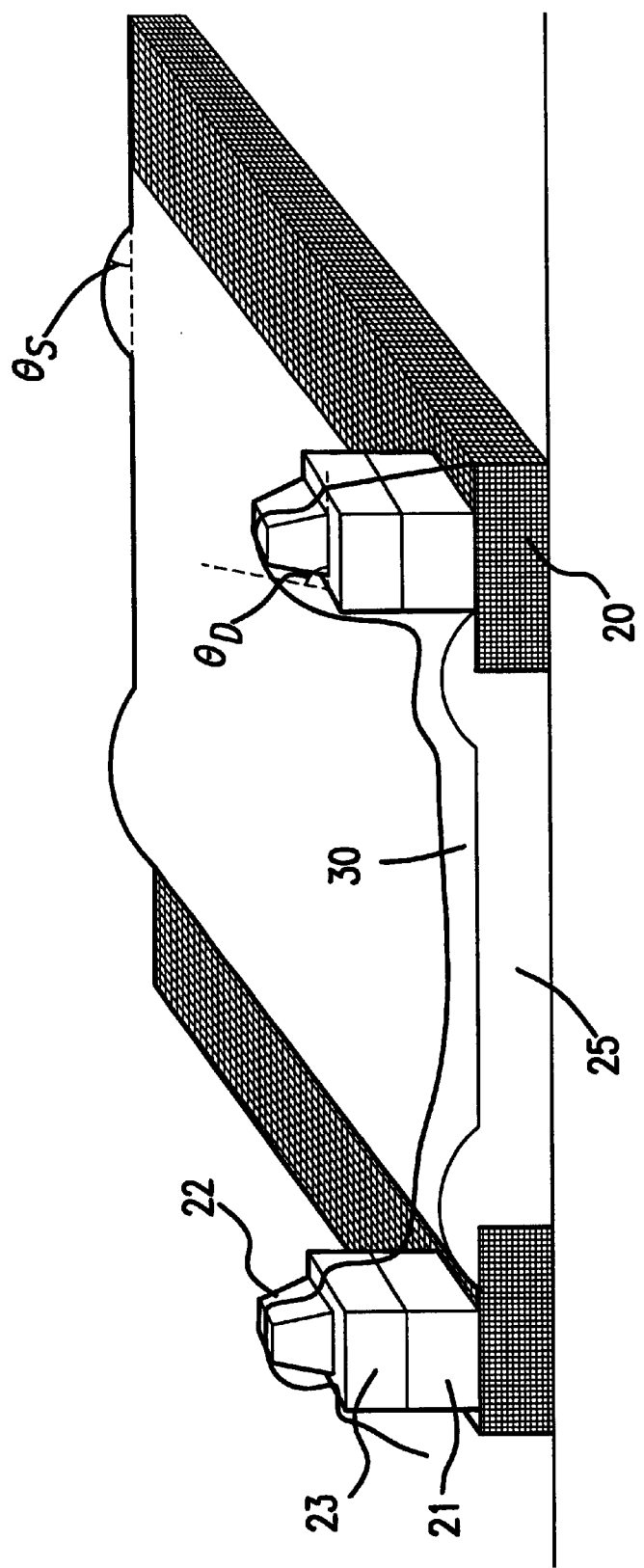
FIG. 10: is a schematic diagram of a colour filter where a transparent film has been formed on the coloured layers of the coloured filter shown in FIG. 9.

A resin black matrix pattern was produced on an alkali-free glass substrate in the same way as in Example 1, and coloured layers also formed by the same procedure as in Example 1. However, while the spacer arrangement density was the same as in Example 5, as shown in FIG. 8 the spacers positioned at each colour pixel portion were arranged so as to be equivalent for each colour.

The spacer height was measured at 9 points within the screen for this colour filter. For the blue and green pixel regions it was 6.9 μm and the variation was 0.15 μm based on the 3σ value. However, in regard to the spacers formed on the black matrix facing the red colour pixel regions, the average value was 6.40 μm and the variation was 0.15 μm based on the 3σ value. Hence, while the variation was about the same, a considerable difference was found in the height itself. With spacers where a sufficient height is not obtained, since they do not function as spacers, the density of the effectively-functioning spacers is reduced.

Furthermore, the spacer area was an average of 130 μm² and the variation was 80 μm² based on the 3σ value, so this was considerably increased when compared to the colour filter obtained in Example 1. When a liquid crystal display device was constructed by the same procedure as in Example 1 using this colour filter, display unevenness due to cell gap unevenness was produced. When the panel was taken apart and the spacers examined, it was found that the spacers formed in the vicinity of the blue and green pixel regions where unevenness was produced were damaged.

EXAMPLE 6

(1) Production of the Colour Filter

A liquid crystal display device was produced in the same way as in Example 1 excepting that, onto the colour filter coloured layer substrate obtained in Example 1, an N-methyl-2-pyrrolidone/butyl cellosolve solution of polyamic acid ($1.0 \times 10^{-5}$ Pa) was applied with a spin coater under conditions so as to give a post-cured film thickness of 1.5 μm, then drying carried out for 3 minutes at 150° C. with a hot plate, after which heating was performed for 10 minutes at 300° C. on the same hot plate to form a protective film layer. At this time $\theta_D$ was 60° and $\theta_S$ was 18°. Further, the thickness $t_D$ of the transparent film on the dot-shaped spacers was 0.1 μm and the thickness of the transparent film in the pixel display region was 1.8 μm. Thus, the relations $90° \geq \theta_D > \theta_S$, $t_S > t_D$, $0 \mu m \leq t_D \leq 1 \mu m$, and $0.05 \mu m \leq t_S \leq 3 \mu m$ were satisfied.

(2) Measurement of the Load Compression Displacement

The load compression displacement of one of the formed spacers was measured by the same procedure as in Example 1. The load compression displacement of this spacer was 0.015 μm/mN.

(3) Measurement of the Spacer Elastic Restitution Factor

The elastic restitution factor of one of the formed spacers was measured by the same procedure as in Example 1. The elastic restitution factor was 60%.

(4) Measurement of the Compression Failure Strength

The failure strength for a compression stress was measured for one of the spacers formed, using the same procedure as in Example 1. The failure strength of this spacer was 0.60 GPa.

(5) Measurement of the Coefficient of Thermal Expansion of the Spacer

Part of the colour filter in which spacers had been formed was cut out, and an optical flat placed on a spacer to produce a sample for measuring the thermal expansion coefficient. Light was directed from the colour filter side (back face) and the change in the interference fringes measured when the temperature was varied between 25 and 50° C. using a light interference meter. The coefficient of thermal expansion was determined by calculation from the height of the spacer at 25° C. and the height at 50° C. As a result, it was found that the coefficient of thermal expansion of this spacer over the range 25 to 50° C. was 50 ppm/° C.

(6) Production of the Liquid Crystal Display Device

A liquid crystal display device was produced by the same procedure as in Example 1 using this colour filter. The liquid crystal display device obtained had a good display quality, with no faults in the liquid crystal alignment, no electrical shorting between the transparent (common) electrode on the colour filter and the transparent electrode or circuit on the active matrix substrate side, and outstanding cell gap uniformity. Further, when the height corresponding to the cell gap of the colour filter obtained was measured at the G pixel region, in Example 1 it was 4.7 μm and in Example 6 it was 3.0 μm.

EXAMPLE 7

(1) Production of the Resin Black Matrix and Seal Region Pattern

The resin black matrix, seal region pattern and screen exterior spacer pattern were formed on an alkali-free glass substrate by the same procedure as in Example 1.

(2) Production of Coloured Layers and Spacers

Acrylic resin (acrylic resin obtained by dissolving 20 parts of methacrylic acid, 10 parts of methyl methacrylate, 55 parts of butyl methacrylate and 15 parts of hydroxyethyl methacrylate in 300 g of ethyl cellosolve, then adding 0.75 part of azobisiso-butyronitrile under a nitrogen atmosphere and reacting for 5 hours at 70° C.) was diluted with ethyl cellosolve so as to give a resin concentration of 10%.

Red, green and blue coloured pastes were prepared by adding 5.7 g of pigment and 0.3 g of dispersing agent to 94 g of this diluted resin, followed by thorough mixing on a triple roll colour mill. As the red, green and blue pigments, the dianthraquinone type pigment denoted by Colour Index No. 65300, Pigment Red 177; the phthalocyanine green type pigment denoted by Colour Index No. 74265, Pigment Green 36; and the phthalocyanine blue type pigment denoted by Colour Index No. 74160, Pigment Blue 15-4; were respectively used.

Firstly, the blue paste was applied onto the resin black matrix substrate, and dried. After drying with hot air at 80° C. for 10 minutes, a 5% solution of polyvinyl alcohol was applied to produce an oxygen barrier film. After drying for 10 minutes at 80° C., exposure was performed using a mask, and then the substrate dipped in developer (aqueous sodium carbonate solution) and at the same time said substrate was moved backwards and forwards, so that etching was effected. Subsequently, cleaning with brush was carried out with pure water. Following water washing and drying, curing was conducted for 60 minutes at 230° C. The film thickness of the colour pixel portions was 2.2 μm. By this patterning, along with the formation of the blue pixels, there was formed the first layer of the spacers on the resin black matrix in the same way as in Example 1.

After water washing, in the same way, along with the formation of the green pixels, there was formed the second layer of the spacers on the resin black matrix. The film thickness of the green pixel portions was 2.2 μm.

After further washing, in the same way, along with the formation of the red pixels, there was formed the third layer of the spacers on the resin black matrix, and the colour filter thereby produced. The film thickness of the red pixel portions was 2.0 μm.

The height of the spacers provided on the resin black matrix by the superposition of the coloured layers was about 4 μm. The spacers were provided at a rate of 2 per 3 pixels within the screen. Further, the shape of the spacers was roughly elliptical. Moreover, spacers were provided at the same density as in Example 1 on the frame formed by the resin black matrix around the screen and on the substrate outside of the screen.

A colour filter to be used as a liquid crystal display element substrate was obtained by forming an ITO film by the sputtering method on the alkali-free glass substrate with this light screening layer and red, green and blue pixels. The thickness of the ITO film was 150 nm and the surface resistance was 15 Ω/□.

(3) Measurement of the Load Compression Displacement

When the load compression displacement of one of the spacers formed was measured by the same method as in Example 1, it was 0.03 μm/mN.

(4) Measurement of Spacer Elastic Restitution Factor

Using a microcompression tester (Shimadzu Corp., MCTE-500), the elastic restitution factor of one of the spacers formed (height 4.0 μm) was measured. The conditions were a loading (unloading) rate of 2.582 mN/s, a compression loat $F_2$ att the time of change from loading→unloading of 60 mN, and a final compression load $F_1$ at time of unloading of 5 mN. When the area of the flattened upper layer portion of the spacer was measured following 60 mN loading, using an optical microscope, it was 110 μm². Consequently, the compression stress at this time was 0.5 GPa. The compression displacement $L_a$ at the final compression load $F_1$ at the time of loading was 0.2 μm; the displacement $L_c$ at the time of the loading→unloading switchover was 1.23 μm; and the displacement $L_b$ at the final compression load 5 mN at the time of unloading was 0.96 μm. These values were introduced in aforesaid numerical formula [I], and the elastic restitution calculated as 26%.

(5) Production and Evaluation of a Colour Liquid Crystal Display Device

A liquid crystal display device was produced by the same procedure as in Example 1 using this colour filter in which spacers had been provided.

The display characteristics of this liquid crystal display device were uniformly good. Part of the display screen was firmly pressed with a finger but, following this pressing, there was no change in the display quality compared to that before.

TABLE 1

| | Spacer Material | Spacer Material Pigment/ Resin Weight Ratio | Load Compression displacement [μm/mN] | Elastic Restitution Factor [%] | Failure strength [GPa] | Thermal Expansion Coefficient [ppm/° C.] |
|---|---|---|---|---|---|---|
| Example 1 | polyimide | 4/6 | 0.02 | 54 | 0.77 | 30 |
| Example 2 | polyimide | 1/9 | 0.5 | | | |
| Example 3 | polyimide | 7/3 | 0.002 | | | |
| Example 6 | polyimide | 4/6 | 0.015 | 60 | 0.60 | 50 |
| Example 7 | acrylic | 5.7/9.4 | 0.03 | 26 | | |
| Comp. Example 1 | epoxy | 1/9 | 1.5 | | | |
| Comp. Example 2 | silicon oxide film | — | 0.0005 | 90 | | 3 |
| Comp. Example 3 | epoxy | 9/1 | 1.2 | | 0.07 | |

What is claimed is:

1. A liquid crystal display element substrate wherein it has spacers fixed in non-display regions on the liquid crystal display element substrate, and the load compression displacement of these spacers for a compression stress of 0.5 to 0.6 GPa is from 0.001 to 1 μm/mN.

2. A liquid crystal display element substrate according to claim 1 where the load compression displacement of the spacers in terms of a compression stress of 0.5 to 0.6 GPa is from 0.002 to 0.5 μm/mN.

3. A liquid crystal display element substrate according to claim 1 where the load compression displacement of the spacers in terms of a compression stress of 0.5 to 0.6 GPa is from 0.01 to 0.1 μm/mN.

4. A liquid crystal display element substrate according to claim 1 where an elastic restitution factor of the spacers in terms of a compression stress of 0.4 to 0.6 GPa is from 20 to 80%.

5. A liquid crystal display element substrate according to claim 4 which is characterized in that the spacers contain a polyimide resin.

6. A liquid crystal display element substrate according to claim 1 where the spacers contain acrylic resin and an elastic restitution factor in terms of a compression stress of 0.4 to 0.6 GPa is from 0.01 to 80%.

7. A liquid crystal display element substrate according to claim 1 where a spacer failure strength in terms of a compression stress is at least 0.1 GPa.

8. A liquid crystal display element substrate according to claim 1 where a coefficient of thermal expansion of the spacers at 25 to 50° C. is from 10 to 100 ppm/° C.

9. A liquid crystal display element substrate according to claim 1 which has spacers within a screen and outside a screen.

10. A liquid crystal display element substrate according to claim 1 wherein the spacers are formed by patterning of resin layers.

11. A liquid crystal display element substrate according to claim 1 where the substrate is a colour filter containing coloured layers which comprise a resin layer containing colouring agent.

12. A liquid crystal display element substrate according to claim 11 where the spacers are formed by colour superposition of the resin layers containing colouring agent.

13. A liquid crystal display element substrate according to claim 12 where the spacers are formed by the colour superposition of black matrix and coloured layers comprising resin containing colouring agent of three primary colours.

14. A liquid crystal display element substrate according to claim 13 wherein the black matrix comprises resin in which black pigment has been dispersed.

15. A liquid crystal display element substrate according to any one of claims 10 and 13 to 14, wherein the spacers contain polyimide resin or acrylic resin.

16. A liquid crystal display element substrate according to any one of claims 12 to 14, wherein a weight ratio of the coloured layer resin component to the colouring agent component is from 3:7 to 9:1.

17. A liquid crystal display element substrate according to claim 1 where the spacer height is from 2 to 6 µm.

18. A liquid crystal display element substrate according to claim 1 where an area of contact with a facing substrate of the spacers within a screen is from 10 to 1000 µm² per spacer.

19. A liquid crystal display element substrate according to claim 18 where the area of contact with the facing substrate of the spacers within the screen is from 10 to 250 µm² per spacer.

20. A liquid crystal display element substrate according to claim 9 wherein an area of contact, per spacer, with a facing substrate of the spacers outside the screen is greater than an area of contact, per spacer, with the facing substrate of the spacers inside the screen.

21. A liquid crystal display element substrate according to claim 1 wherein an area of contact of the spacer with a facing substrate is smaller than an area of a spacer bottom portion.

22. A liquid crystal display element substrate according to claim 9 wherein an area, per spacer, of a spacer bottom portion within the screen is smaller than an area, per spacer, of the spacer bottom portion outside the screen.

23. A liquid crystal display element substrate according to either claim 12 or 13 wherein, of patterns forming the spacers, an area of the pattern laminated as an uppermost layer is smaller than an area of the patterns laminated as second and first layers.

24. A liquid crystal display element substrate according to either claim 12 or 13 wherein, of patterns forming the spacers, an area of the pattern laminated as an uppermost layer is greater than an area of the patterns forming second or first layers.

25. A liquid crystal display element substrate according to claim 1 where a number of spacers arranged on the substrate is no more than 100 per mm² at an arbitrary point within the substrate.

26. A liquid crystal display element substrate according to claim 25 where a number of spacers arranged on the substrate is no more than 50 per mm² at an arbitrary point within the substrate.

27. A liquid crystal display element substrate according to claim 26 where a number of spacers arranged on the substrate is from 5 to 50 per mm² at an arbitrary point within the screen.

28. A liquid crystal display element substrate according to claims 12 or 13 where the spacers lie near specified colour pixels.

29. A liquid crystal display element substrate according to claim 1 wherein the spacers are positioned at a specified period in terms of a pixel pattern.

30. A liquid crystal display element substrate according to claim 29 wherein the spacer positioning period is of a longer period than the pixel pattern period.

31. A liquid crystal display element substrate according to claim 29 wherein the spacer positioning period is different in a screen lengthwise direction and widthwise direction.

32. A liquid crystal display element substrate according to claims 12 or 13 wherein, in regard to an uppermost coloured layer from which spacers are composed, a taper angle $\theta_d$ of a spacer uppermost layer region and a taper angle $\theta_s$ of a stripe region from which the pixel portion is formed have the following relationship, $$90° \geq \theta_d > \theta_s.$$

33. A liquid crystal display element substrate according to claim 1 wherein a transparent film is formed on resin layers containing pigment.

34. A liquid crystal display element substrate according to claim 33 wherein a thickness $t_d$ of the transparent film on the fixed spacers and a thickness $t_s$ of the transparent film on display regions have the relation $$t_s > t_d.$$

35. A liquid crystal display element substrate according to claim 34 where the aforesaid thickness $t_d$ of the transparent film on the spacers is no more than 1 µm and the aforesaid thickness $t_s$ of the transparent film on the display regions is from 0.05 to 3 µm.

36. A colour liquid crystal display device wherein, in a colour liquid crystal display device where a liquid crystal layer is held between two liquid crystal display element substrates, at least one of these liquid crystal display element substrates is a liquid crystal display element substrate according to any one of claims 1 to 12.

* * * * *